(12) United States Patent
Omura et al.

(10) Patent No.: US 7,042,949 B1
(45) Date of Patent: May 9, 2006

(54) ROBUST DATA TRANSMISSION USING BROADCAST DIGITAL TELEVISION SIGNALS

(75) Inventors: Jimmy K Omura, San Francisco, CA (US); James J Spilker, Jr., Woodside, CA (US); Matthew Rabinowitz, Palo Alto, CA (US)

(73) Assignee: Rosum Corporation, Mountain View, CA (US)

( * ) Notice: Subject to any disclaimer, the term of this patent is extended or adjusted under 35 U.S.C. 154(b) by 727 days.

(21) Appl. No.: 10/003,128

(22) Filed: Nov. 14, 2001

Related U.S. Application Data

(60) Provisional application No. 60/281,269, filed on Apr. 3, 2001.

(51) Int. Cl.
  *H04N 7/12* (2006.01)
  *H04N 11/02* (2006.01)

(52) U.S. Cl. .............................. 375/240.28; 375/240.22

(58) Field of Classification Search ........... 375/240.26, 375/240.01, 342, 343; 348/614, 611
See application file for complete search history.

(56) References Cited

U.S. PATENT DOCUMENTS

| | | | |
|---|---|---|---|
| 5,157,686 A | 10/1992 | Omura et al. ................... 375/1 |
| 5,166,952 A | 11/1992 | Omura et al. ................... 375/1 |
| 5,493,339 A | 2/1996 | Birch et al. |
| 5,999,223 A * | 12/1999 | Patel et al. ................. 348/555 |
| 6,160,587 A | 12/2000 | Walker et al. |
| 6,313,885 B1 * | 11/2001 | Patel et al. ................. 348/725 |
| 6,400,767 B1 | 6/2002 | Nuber et al. |
| 6,487,500 B1 | 11/2002 | Lemelson et al. |
| 6,711,214 B1 * | 3/2004 | Hershberger ................ 375/285 |
| 6,727,847 B1 * | 4/2004 | Rabinowitz et al. ... 342/357.06 |
| 6,753,812 B1 * | 6/2004 | Rabinowitz et al. ........ 342/464 |
| 6,760,077 B1 * | 7/2004 | Choi et al. ................... 348/614 |
| 6,768,517 B1 * | 7/2004 | Limberg et al. ............. 348/614 |
| 6,816,628 B1 * | 11/2004 | Sarachik et al. ............ 382/285 |
| 2001/0046262 A1 * | 11/2001 | Freda .................... 375/240.03 |
| 2002/0090997 A1 | 7/2002 | Bailey |
| 2002/0144294 A1 | 10/2002 | Rabinowitz et al. |
| 2002/0172313 A1 | 11/2002 | Smith et al. |

\* cited by examiner

*Primary Examiner*—Vu Le
*Assistant Examiner*—Dave Czekaj
(74) *Attorney, Agent, or Firm*—Richard A. Dunning, Jr.

(57) ABSTRACT

A DTV signal includes frames, and the frames include data segments. Data segments are replaced by codewords which represent digital data. The DTV signals are broadcast and received by receivers. The receivers recover the digital data from the codewords in the DTV signals, for example by using matched filtering. By using long codewords, the digital data can be broadcast over a longer range and recovered by simpler circuitry in comparison to the television programming contained in the DTV signal. In one implementation, the DTV signal is an American Television Standards Committee (ATSC) DTV signal.

79 Claims, 14 Drawing Sheets

ROBUST DATA TRANSMISSION USING BROADCAST DIGITAL TELEVISION SIGNALS

CROSS-REFERENCE TO RELATED APPLICATION

This application claims priority under 35 U.S.C. 119(e) from U.S. Provisional Patent Application Ser. No. 60/281,269, "An ATSC Standard DTV Channel for Low Data Rate Broadcast to Mobile Receivers," by James J. Spilker and Matthew Rabinowitz, filed Apr. 3, 2001, which subject matter is incorporated herein by reference.

BACKGROUND OF THE INVENTION

1. Field of the Invention

This invention relates generally to the transmission of data via broadcast digital television signals, for example digital television signals which follow the American Television Standards Committee (ATSC) format.

2. Description of the Related Art

Starting with the first ATSC standard digital television broadcast in the late 1990's, digital television broadcasting is rapidly expanding in the United States. By the end of 2000, more than 166 digital television transmitters were in operation. The FCC has set a goal that by 2006 all television broadcasting will be on recently assigned digital channels with the analog channels being returned to the government for other applications.

Sophisticated data compression techniques and the availability of increased digital signal processing capabilities make it possible to transmit high quality audio and video information in the same bandwidth as analog channels. In the television broadcast community, the Advanced Television Systems Committee (ATSC) created both the digital television standard and the high-definition television standard to take advantage of these technological advances. These standards are often referred to as ATSC digital TV or simply ATSC. A current ATSC standard uses the amplitude modulated suppressed-carrier vestigial sideband modulation technique called VSB. The 8-VSB modulation is used in terrestrial "off air" broadcast systems and the 16-VSB modulation is proposed for higher data rate cable systems.

These standards are optimized for the broadcast of TV programming. However, the rapid expansion of digital TV broadcasting and the corresponding proliferation of digital television transmitters creates opportunities for the transmission of other types of data. Examples of other types of data include data to allow cell phones to compute their own location without the need for external processing, short messages, applications similar to those on pagers, stock quotes, web pages in text form, simple grid maps showing places of interest near a cell phone, TV programming guide, radio programming guide, bus schedules, advertisements for stores in the vicinity of the receiver, and all types of low data rate mobile-commerce information.

The television infrastructure is not always suited for these types of data. For example, the ATSC standard is geared towards a certain spectral efficiency, meaning that a certain amount of information is to be transmitted over a certain spectral bandwidth. Specifically, a bit rate which is high enough to support the broadcast of television programming must fit into the bandwidth allocated for a single television channel. With this operating requirement, a certain signal to noise ratio is required in order to successfully receive the broadcast signal. For example, the 19.2 Mbps ATSC standard broadcast data rate requires the receiver to have a threoretical signal-to-noise ratio of 15 dB.

However, other operating points may be more suitable for other types of data. For example, low data rate applications may benefit from a lower spectral efficiency but a more robust transmission. This type of signal may be recovered at much lower signal to noise ratios than required to receive digital television broadcasts, thus allowing reception in remote areas, indoors, or in locations where interference or multipath causes problems. In addition, simpler receivers may be used compared to those required to receive digital television broadcasts.

Thus, there is a need for systems and methods which can take advantage of the rapidly expanding digital TV (DTV) infrastructure, but for the transmission of data other than television programming. In particular, lower data rate transmissions which are more robust are of interest.

SUMMARY OF THE INVENTION

In accordance with the present invention, digital data is transmitted as part of a digital television (DTV) broadcast signal by encoding the digital data as codewords and replacing some of the data segments in the DTV signal with the codewords. The use of long codewords results in a transmission which is more robust than the portions of the DTV broadcast signal used for television programming and can therefore be received at lower signal to noise ratios. The use of a finite set of codewords allows recovery of the digital data using a simple bank of correlators at the receiver.

In one implementation, the DTV signal is an American Television Standards Committee (ATSC) DTV signal. In the ATSC standard, the data segments are MPEG compatible data packets that contain 187 bytes of data plus one sync byte in each packet or data segment. Similar 187 byte packets are also used in the Digital Video Broadcast (DVB) standard used by the European DTV systems. Direct Broadcast Satellites (DBS) also use fix size data segments for DTV broadcast by satellites.

In one implementation, the digital data is encoded into codewords as follows. The digital data is divided into bit sequences. Each bit sequence is encoded as a corresponding codeword which is selected from a finite set of codewords. In one embodiment, the bit sequences are all the same length, the codewords are all the same length and are all orthogonal to each other, and the codewords are longer than the bit sequences. For example, the digital data may be divided into 3-bit sequences, with a different codeword assigned to each of the eight possible 3-bit sequences. Furthermore, each codeword may be the same length as a full data segment (i.e., 828 symbols in the ATSC standard), thus resulting in a much more robust data transmission system compared to the television programming data contained in the DTV signal.

In another aspect of the invention, only certain preselected data segments are replaced by codewords. For example, certain data segments within each frame may be dedicated to this alternate robust data channel. In another implementation, only data segments which are not otherwise used (e.g., data segments containing so called "null packets") are replaced by codewords. For example, the data segments may be replaced on an as-available basis.

Also according to the present invention, a method for recovering data from a broadcast DTV signal includes the following steps. The broadcast DTV signal is received. The DTV signal is made up of frames, with each frame made up of data segments. Some of the data segments have been replaced by codewords representing digital data. The digital data is recovered from the received DTV signal. In one implementation, the DTV signal is an ATSC DTV signal.

In one implementation, the digital data is recovered by correlation. For example, if a finite set of codewords is used, a bank of correlators can be applied to data segments in the received DTV signal. The bank of correlators receives the data segments from a receiver's front end. Each correlator in the bank correlates the data segment against a different codeword (e.g., using a matched filter in one implementation). The outputs of the correlators are compared by a comparator to make a decision as to which codeword was transmitted in a data segment. The codeword which produces the highest correlation is selected. The bit sequence corresponding to the selected codeword is output.

In an alternate embodiment, the ATSC frames include a field synchronization segment. The field synchronization segment is located, thus framing the received DTV signal. The location of each data segment of a data frame can then be determined with respect to the field synchronization segment. In one approach, the field synchronization segment occurs once every N segments. It is located as follows. Incoming data segments are correlated against a template for the field synchronization segment. The correlations are used to generate N counts, each count reflecting a number of times every Nth correlation exceeds a threshold. The field synchronization segment is identified by determining which of the N counts is the largest.

In another aspect of the invention, various types of devices can implement the methods described above. For example, in one approach, standard DTV transmitters are modified to implement the transmission functionality. For example, the equipment which currently inserts the field synchronization segments into the DTV signal can be modified to insert codewords also.

On the receiver side, various implementations are possible. In one approach, the receiver recovers the digital data by correlating the incoming DTV signals against the possible codewords. This can be implemented by digital circuitry, analog circuitry, firmware or software, to name a few examples.

BRIEF DESCRIPTION OF THE DRAWING

The invention has other advantages and features which will be more readily apparent from the following detailed description of the invention and the appended claims, when taken in conjunction with the accompanying drawing, in which:

DETAILED DESCRIPTION OF THE PREFERRED EMBODIMENTS

Figure 1:
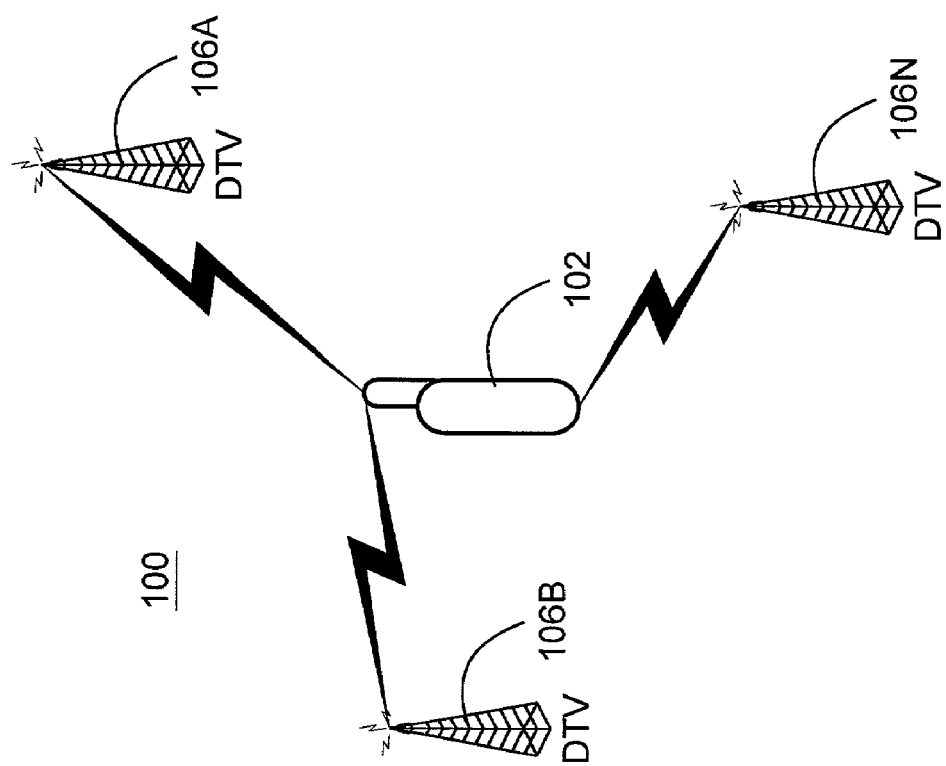
FIG. 1 is a block diagram of a system according to the present invention.

FIG. 1 is a block diagram of an example system 100 according to the present invention. System 100 includes a receiver 102 that receives digital television (DTV) broadcasts from one or more DTV transmitters 106A–N.

One example of a DTV transmitter 106 is a transmission tower which broadcasts DTV signals over the air to receiver 102. Another example is the transmitter for a cable television system, in which case the DTV signals arrive at the receiver 102 via a cable link. Satellite TV systems, also known as Direct Broadcast Satellites (DBS), are another example of digital TV broadcast systems. For example, EchoStar and DirecTV are the primary DBS services in the U.S. market. Generally speaking, there currently are three basic types of commercial digital TV broadcast systems: terrestrial, cable, and satellite. Satellite TV systems are all digital; whereas cable and terrestrial systems are converting to digital from their mostly analog predecessors. These digital TV systems use frame structures that are made up of encoded data packets. These data packets are also referred to as data segments.

The receiver 102 is meant to refer to any object capable of implementing the low data rate channel described below. Receivers 102 may also be capable of receiving the television programming data carried on the DTV signals but this is not required. Receivers 102 may be stationary and/or mobile. Virtually any object which could include a chip or software implementing the robust low data rate channel described below could be a receiver 102. Thus, DTV televisions, pagers, mobile telephones, PDAs, computers, cars and other vehicles would all be examples of receivers 102 if properly equipped.

In system 100, the DTV transmitter 106 transmits digital data to the receiver 102 at a data rate which is significantly less than that of broadcast television programming data. The robust low data rate digital data is inserted into the DTV signal broadcast at the transmitter 106. The DTV signal is received by the receiver 102, which recovers the digital data from the DTV signal.

For example, in one application, the digital data is local street maps showing places of interest near a cell phone. Other applications include data to allow cell phones to compute their own location without the need for external processing, short messages, applications similar to those on pagers, stock quotes, news headlines, TV programming guide, radio programming guide, bus schedules, short text advertisements for stores in the location of the receiver, and all types of low data rate M-commerce information. Based on today's technology, most of the digital data for these applications will consist of short text and/or simple graphs, for example representing maps. Many data broadcast applications can have low data rate versions. For example, the Wireless Application Protocol (WAP), the current generation mobile data technology that reformats Web pages to fit into tiny wireless screens, was introduced in 1999. An even simpler text only version is an example application for a robust low data rate system using DTV signals.

Figure 2:
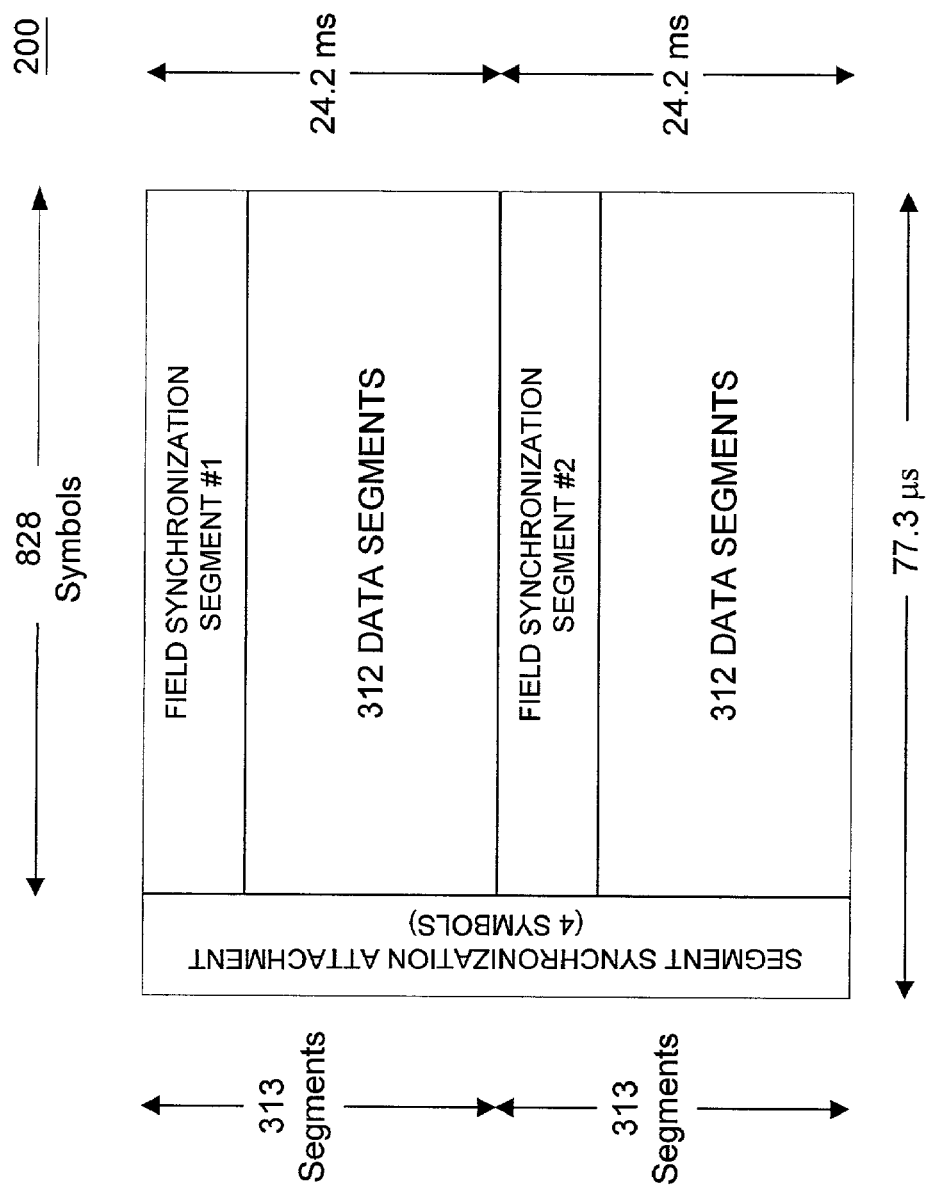
FIG. 2 illustrates the structure of an ATSC frame.

FIG. 2 is a representation of the structure of an ATSC frame from the current ATSC standard. The current ATSC signal is described in "ATSC Digital Television Standard and Amendment No. 1," Mar. 16, 2000, by the Advanced Television Systems Committee, which is incorporated herein by reference in its entirety. The ATSC signal for terrestrial broadcast uses 8-ary vestigial sideband modulation (8-VSB). The symbol rate of the ATSC signal is 10.76 MHz, which is derived from a 27.00 MHz clock. The structure 200 of the ATSC frame is illustrated in FIG. 2. The frame 200 includes a total of 626 segments, each with 828 symbols. Each segment is followed by four symbols that are used for synchronization purposes. These will be referred to as the segment synchronization attachment. In FIG. 2, time travels from right to left. There is a total of 520,832 symbols per frame. Each segment (plus the corresponding segment synchronization attachment) lasts 77.3 microseconds. The 1st and 314th segment in each frame are field synchronization segments. Following each field synchronization segment are 312 data segments.

Each field synchronization segment is one of two fixed, known 828-symbol sequences. The two 828-symbol sequences differ only to the extent that a 63 symbol section is inverted in one sequence relative to the other. Some additional symbols in these field synchronization segments are different for each transmitter. One of these two known field synchronization segments is transmitted every 24.2 milliseconds. These symbol sequences were included as a training sequence to help the ATSC receivers correct for multipath typically found in broadcast channels. The field synchronization segments can be viewed as spread spectrum codewords that are buried in the ATSC data sequence. A spread spectrum codeword is typically detected with correlators (e.g., matched filters). If there are multipath signals of an ATSC broadcast signal at a receiver, then the output of such correlators can provide estimates of the parameters of the multipath signals. Because a field synchronization segment appears once every 24.2 milliseconds, they can be used to provide a periodic snapshot of the multipath signals. For dynamically changing multipath signals, the multipath characteristics during the interim period can be estimated using conventional methods such as blind equalizations or other interpolation schemes.

The data segments are where the television programming data is carried. Each data segment corresponds to a 188-byte data packet in the MPEG-2 transport layer. Each 188-byte data packet is expanded into 828 3-bit coded data symbols using a combination of a Reed-Solomon encoder, interleaver, and rate 2/3 trellis encoder. Data segments may also be used to carry other information such as web content from the Internet or may be unused in which case the data segment is said to contain a null packet.

The segment synchronization attachment is the same for all segments. It consists of the four symbol sequence (−1, 1, 1, −1) and is typically used for segment synchronization.

Implementations of the invention can be extended to use future enhancements to DTV signals. For example, the ATSC signal specification allows for a high rate 16-VSB signal primarily for digital cable television. However, the 16-VSB signal has the same general frame structure as the 8-VSB signal, using field synchronization segments and data segments. Therefore, it is straightforward to extend the 8-VSB examples shown below to the 16-VSB signal.

The 8-VSB signal is constructed by filtering. The in-phase segment of the symbol pulse has a raised-cosine characteristic, as described in J. G. Proakis, *Digital Communications*, McGraw-Hill, 3$^{rd}$ edition, 1995. The pulse can be described as $$p(t) = \text{sinc}\left(\frac{\pi t}{T}\right) \frac{\cos\left(\frac{\pi \beta t}{T}\right)}{1 - \frac{4\beta^2 t^2}{T^2}} \quad (1)$$

where T is the symbol period $$T = \frac{1}{10.76 \times 10^6} \quad (2)$$

and $\beta = 0.5762$. This signal has a frequency characteristic $$P(f) = \begin{cases} T & \left(0 \le |f| \le \frac{1-\beta}{2T}\right) \\ \frac{T}{2}\left\{1 + \cos\left[\frac{\pi T}{\beta}\left(|f| - \frac{1-\beta}{2T}\right)\right]\right\} & \left(\frac{1-\beta}{2T} \le |f| \le \frac{1+\beta}{2T}\right) \\ 0 & \left(|f| > \frac{1+\beta}{2T}\right) \end{cases} \quad (3)$$

from which it can be seen that the one-sided bandwidth of the signal is $(1+\beta)10.762237$ MHz=5.38 MHz+0.3 MHz. In order to create a VSB signal from this in-phase pulse, the signal is filtered so that only a small portion of the lower sideband remains. This filtering can be described as:

$$P_v(f) = P(f)(U(f) - H_\alpha(f)) \quad (4)$$

where $$U(f) = \begin{cases} 1, & f \ge 0 \\ 0, & f < 0 \end{cases} \quad (5)$$

and $H_\alpha(f)$ is a filter designed to leave a vestigial remainder of the lower sideband. The filter satisfies the characteristics $H_\alpha(-f) = -H_\alpha(f)$ and $H_\alpha(f) = 0$, $f > \alpha$. The response $U(f)P(f)$ can be represented as $$U(f)P(f) = \tfrac{1}{2}(P(f) + j\breve{P}(f)) \quad (6)$$

where $\breve{P}(f) = -j \, \text{sgn}(f)P(f)$ is the Hilbert transform of $P(f)$. The VSB pulse may be represented as $$P_v(f) = \frac{1}{2}X(f) + \frac{j}{2}\left(\breve{X}(f) + 2X(f)H_\alpha(f)\right) \quad (7)$$

and the baseband pulse signal $$p_v(t) = \frac{1}{2}x(t) + \frac{j}{2}(\breve{x}(t) + x_\alpha(t)) = p_{vi}(t) + jp_{vq}(t) \quad (8)$$

where $p_{vi}(t)$ is the in-phase component, $p_{vq}(t)$ is the quadrature component, and $$x_\alpha(t) = 2\int_{-\alpha}^{\alpha} X(f)H_\alpha(f)e^{j2\pi ft}df \quad (9)$$

Before the data is transmitted, the ATSC signal also embeds a carrier signal, which has −11.5 dB less power than the data signal. This carrier aids in coherent demodulation of the signal. Consequently, the transmitted signal can be represented as:

$$s(t) = \sum_n C_n\{p_{vi}(t-nT)\cos(\omega t) - p_{vq}(t-nT)\sin(\omega t)\} + A\cos(\omega t) \quad (10)$$

where $C_n$ is the 8-level data signal.

Figure 3:
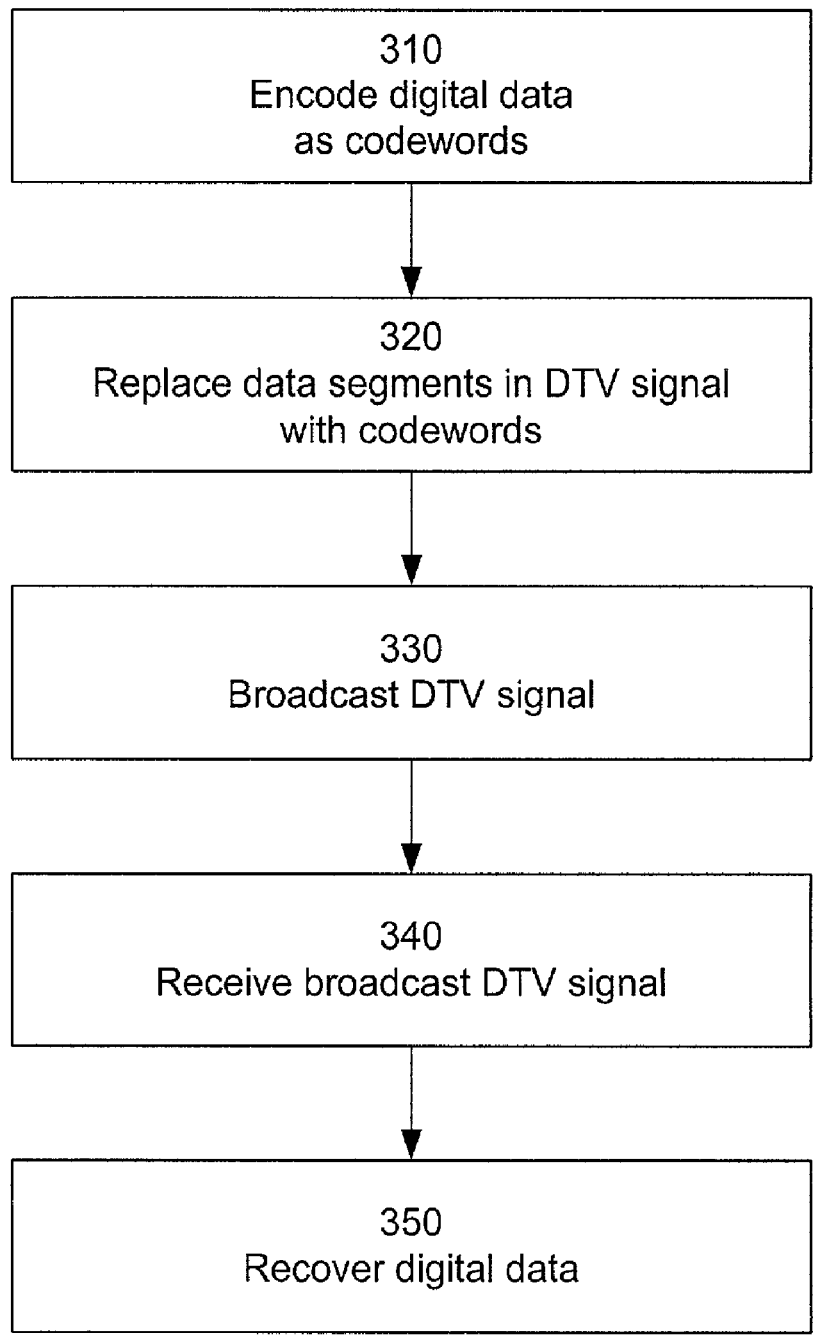
FIG. 3 is a flow diagram illustrating a method for transmitting and receiving low data rate data using an ATSC DTV signal.

FIG. 3 is a flow diagram illustrating a method 300 for transmitting digital data using ATSC frames 200. In general, some of the data segments are replaced by codewords representing the digital data to be transmitted. In more detail, the digital data to be transmitted is encoded 310 as codewords. The codewords replace 320 data segments within the DTV signal. The DTV transmitter 106 broadcasts 330 the DTV signal containing the codewords. The receiver 102 receives 340 the broadcast signal, from which the digital data is recovered 350.

Consider first a simple example in which one data segment in each frame is replaced by one of two possible codewords, each of which is 828 symbols long. In other words, each codeword is the same length as a data segment. One codeword represents binary 0 and the other represents binary 1. The two codewords preferably are orthogonal to each other. In this simple example, one bit of data can be transmitted per ATSC frame, for a data rate of approximately 21 bits per second (bps).

If the two codewords are orthogonal, a simple non-coherent receiver has the same performance as the common non-coherent reception of binary frequency shift keyed signals. Thus, in an ideal white Gaussian noise channel model, the bit error probability is given by $$P_b = 0.5 \exp\{-E_b/2N_o\} \quad (11)$$

where $N_o$ is the double sided noise spectral density and $E_b$ is the energy per bit. In this case, $E_b$ for the single bit being transmitted is the energy at the receiver for the entire 828-symbol segment. It is equal to the TV transmitter power at the receiver multiplied by the 77.3 microseconds of the segment duration. Thus, $E_b$ is 29 dB greater than the energy for each DTV broadcast symbol.

As a result, the digital data can be recovered from broadcast signals that are much weaker than is acceptable for TV reception. For example, signals which are 30 to 40 dB weaker than needed for the reception of digital TV signals may be suitable for use with these low data rate channels. This, in turn, means that the digital data can be recovered over a much wider range than the typical DTV reception range. In addition, reception of this low data rate channel is possible in many indoor locations where broadcast TV reception is difficult.

Another advantage of this approach is that reception of the low data rate signal can be accomplished with receivers that are much simpler than the standard DTV receivers, as will be discussed in further detail below. For this type of data transmission, simple non-coherent energy detection of codewords using correlators at the receiver is appropriate. This type of receiver is simple in design, small in size, and low in energy consumption.

Another advantage is that significant expenses are not required to implement the transmitter either, as will be discussed in further detail below. Many DTV transmitters already include standard equipment at the broadcast station for replacing individual segments in the DTV signal. This equipment may be used to replace certain segments with the field synchronization segments or to replace null MPEG packets which arise, for example, because there is no TV programming data to send at the transmission times of these data segments. To implement the required transmitter functionality, this equipment need only be modified to replace certain data segments with codewords instead.

Figure 4A:
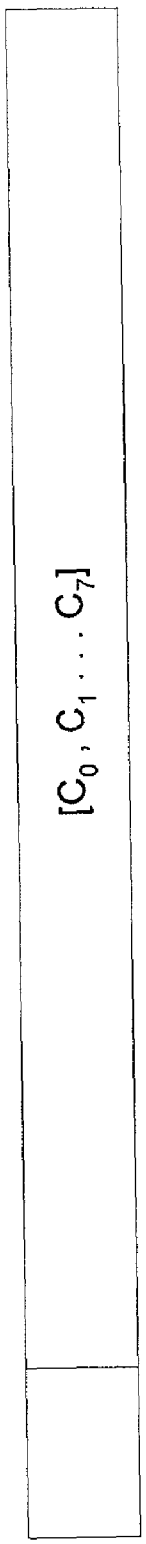
FIGS. 4A–4D illustrate data segments which have been replaced by codewords using various approaches.

The simple example given above results in a data rate of approximately 20 bps. The data rate can be increased in a number of ways. For example, more than one bit can be carried by each replaced 828-symbol data segment in a frame. In one approach, more than two codewords are used. For example, the incoming digital data may be divided into bit sequences each of which is three bits long. Each of these bit sequences is encoded as a codeword selected from a set of eight possible 828-symbol codewords. Each of the eight codewords corresponds to one of the eight possible 3-bit sequences. The eight codewords preferably are orthogonal to each other in order to facilitate reception. Depending on the 3-bit sequence, one of the eight codewords is inserted into the DTV signal, replacing the corresponding data segment in a frame, as shown in FIG. 4A. Here the data rate is now approximately 62 bps. In the notation used, a codeword is represented by the $C_n$ and the notation $[C_0, \ldots C_{N-1}]$ represents one codeword selected from the set of N codewords. Typically, one codeword selected from the finite set of N codewords is used to replace a data segment. If N=8 then a codeword would represent one of the eight possible 3-bit sequences. A lookup table can be used to convert from the 3-bit sequences to the corresponding codewords. In a generalization of this example, $2^N$ codewords can be used to replace bit sequences which are N bits long.

Generally, the set of codewords should be selected so that they have good correlation properties that minimize reception errors. In additional to being orthogonal, the codewords preferably should have low time shifted crosscorrelation and small side lobes in their autocorrelation function. In general, codewords based on multi-amplitude symbols will result in better correlation properties than those based on binary amplitude symbols. Such sets of codewords have been studied extensively in various applications, especially in spread spectrum communication systems, with the most popular commercial application being the Code Division Multiple Access (CDMA) system used in the IS-95 cell phone standard in the United States. Since the 8-VSB ATSC standard is based on 8 level modulation, codewords using multi-amplitude symbols may be suitable for this standard. More specifically, 4-level or 8-level symbols can be used instead of binary (2-level) symbols. The set of possible codewords may also include codewords which do not represent bit sequences. For example, the 3-bit sequences may be represented by a set of nine codewords, where the ninth codeword represents "no data present."

Figure 4B:
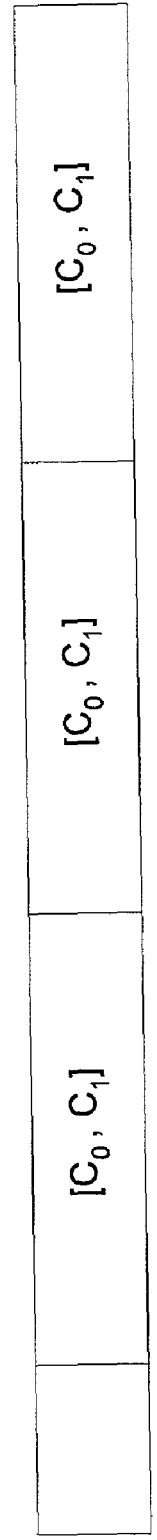

In an alternate embodiment, multiple codewords can be used to replace a single data segment. As shown in FIG. 4B, another way to implement three bits per data segment is to subdivide the data segments into three subsegments, each of which is 828/3=276 symbols long. Each of these subsegments is used to represent one bit and is replaced by one of two possible 276-symbol codewords. If one data segment per frame is replaced by such a set of three codewords then the data rate is approximately 62 bps.

Figures 4C, 4D:
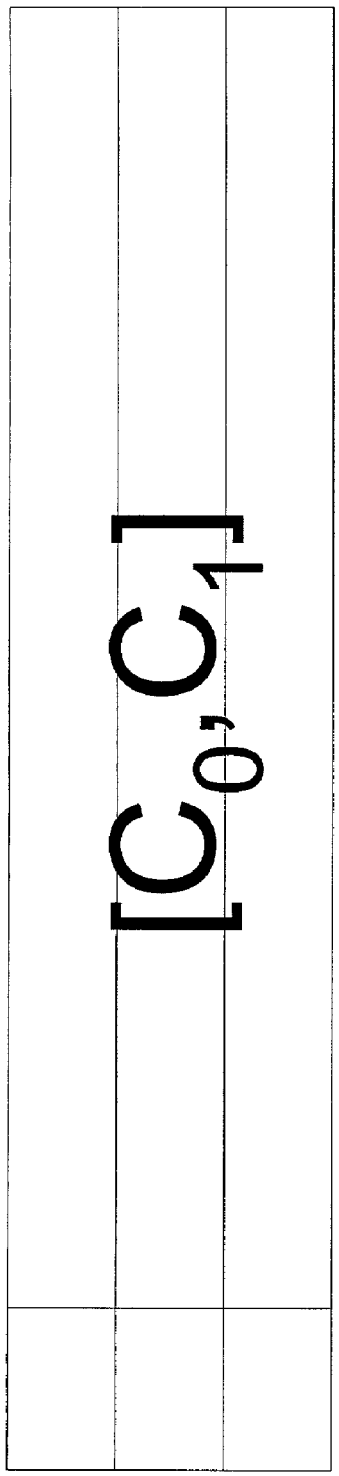

The reverse is also possible. In other words, a single codeword may occupy more than one data segment. For example, if more robust transmission is desired, a 3×828=2,484-symbol codeword may be used, with one of two codewords replacing three data segments, as shown in FIG. 4C.

Other alternatives will be apparent. In FIG. 4A, the digital data was divided into bit sequences, all of which were the same length. In an alternate approach, the digital data is divided into bit sequences of varying lengths, with each bit sequence mapped to a corresponding codeword. The codewords could also be of varying length. Nor is it necessary for all 828 symbols of a data segment to be replaced by codewords. For example, five bits per data segment could be encoded as five 160-symbol codewords, for a total of 800 symbols per data segment, as shown in FIG. 4D. However, this approach generally is not favored since current technology tends to process DTV signals on a segment by segment basis, so the approach in FIG. 4D effectively wastes the remaining 28 symbols in the data segment. In general, however, the codewords typically will have a significantly lower data rate than the data segments which they replace. Generally speaking, as the number of bits per codeword is increased, the robust low data rate receiver becomes more complex and its performance degrades.

The overall data rate can also be increased by increasing the number of data segments per frame used for the low data rate channel. Under the current ATSC standard, if all data segments were used to transmit television programs, the resulting DTV signal would have a data rate of approximately 19.2 Mbps. Current TV signals typically do not require this much bandwidth. For example, HDTV typically requires about 12–15 Mbps and standard definition TV typically requires about 3–5 Mbps. This leaves anywhere from 20–80% of the overall capacity as unused. If 20% of the overall capacity is used for the low data rate channel, then 125 data segments per data frame will be used for this channel. If 5 bits are encoded on each data segment, the overall data rate will be approximately 12.5 Kbps. By doing this, approximately 4 Mbps of television programming is replaced by a 12.5 Kbps low data rate channel, but the low data rate channel is much more robust and can be received over longer ranges using simpler receiver technology.

Figure 5A:
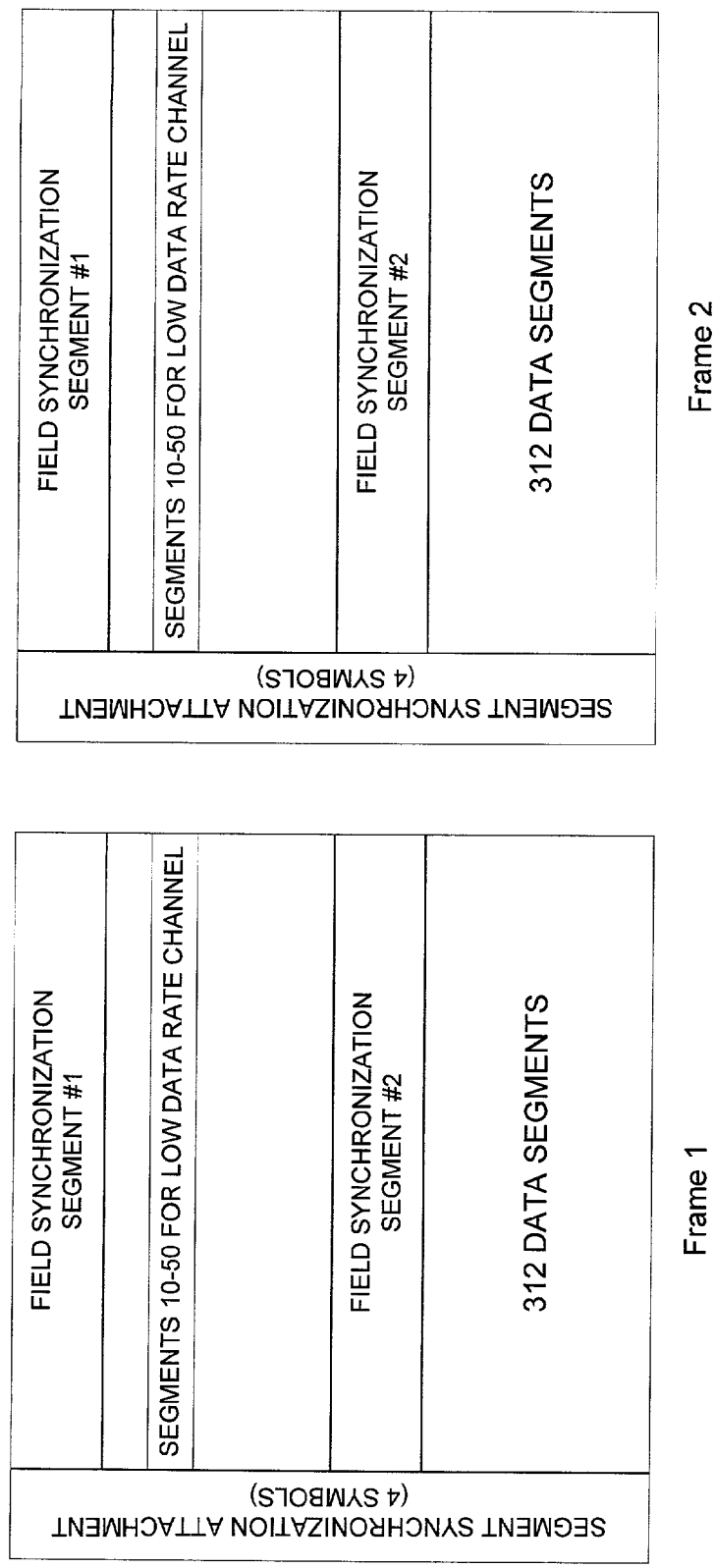
FIGS. 5A–5B illustrate frames in which various data segments have been replaced by codewords.

The selection of which and how many data segments are to be replaced can also be implemented in a number of ways. A straightforward approach is to replace preselected data segments. For example, in FIG. 5A, data segments 10–50 of each frame are dedicated to the low data rate channel and these are the data segments which are replaced by codewords. In this case, the receiver can be further simplified. The receiver knows a priori that only data segments 10–50 can contain codewords. So it need only test these data segments for codewords. Furthermore, if a codeword is always present in these data segments, then the receiver need only determine which of the possible codewords is the most likely one to have been transmitted. In other words, if there are eight possible codewords (e.g., representing different 3-bit sequences) then the receiver need only decide which of the eight codewords was transmitted in the received data segment intervals. It need not determine whether a codeword is present.

Figure 5B:
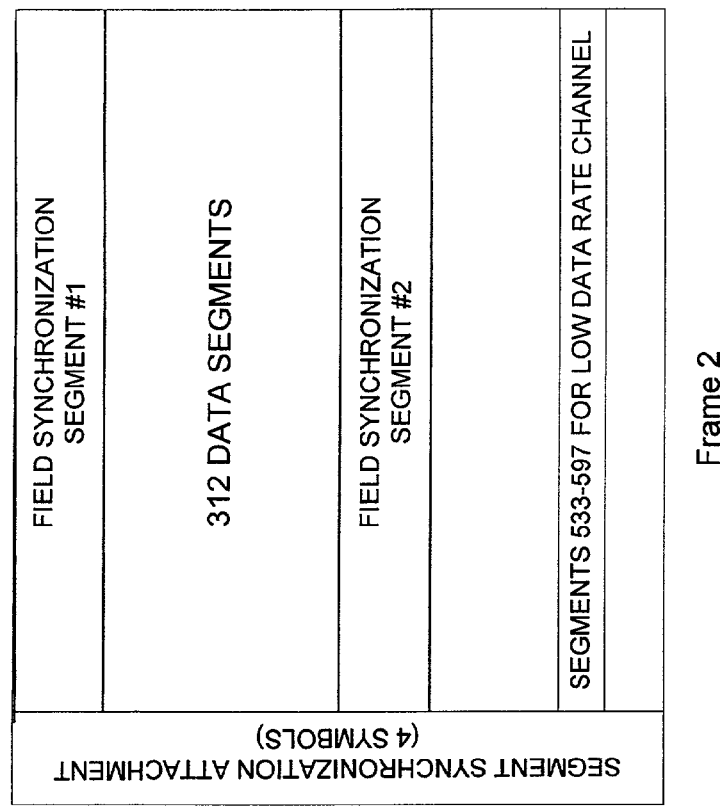
Figure 5B:
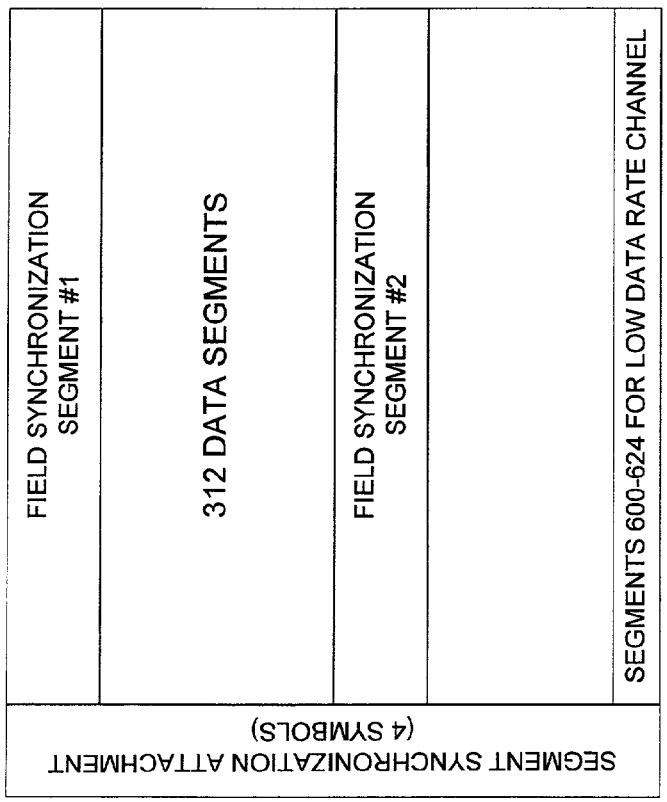

In an alternate approach, data segments are replaced by codewords on an as-available basis. For example, the transmitter may determine whether a data segment contains a data packet or a null packet. That is, the transmitter determines whether the data segment is used or unused. If it contains data, then that data segment is not used for the low data rate channel. Only unused data segments, typically referred to as "null packets," are replaced by codewords. In FIG. 5B, data segments 600–624 of frame 1 are not being used and are replaced by codewords. In the next frame, data segments 533–597 are not being used and are replaced by codewords. In this case, the receiver may not know a priori which data segments contain codewords. Using correlation thresholds, the receiver must first estimate which data segments contain codewords.

These two approaches can also be combined. For example, data segments 10–50 may be dedicated to the low data rate channel and any additional unused data segments may also be available for the low data rate channel.

Figure 6:
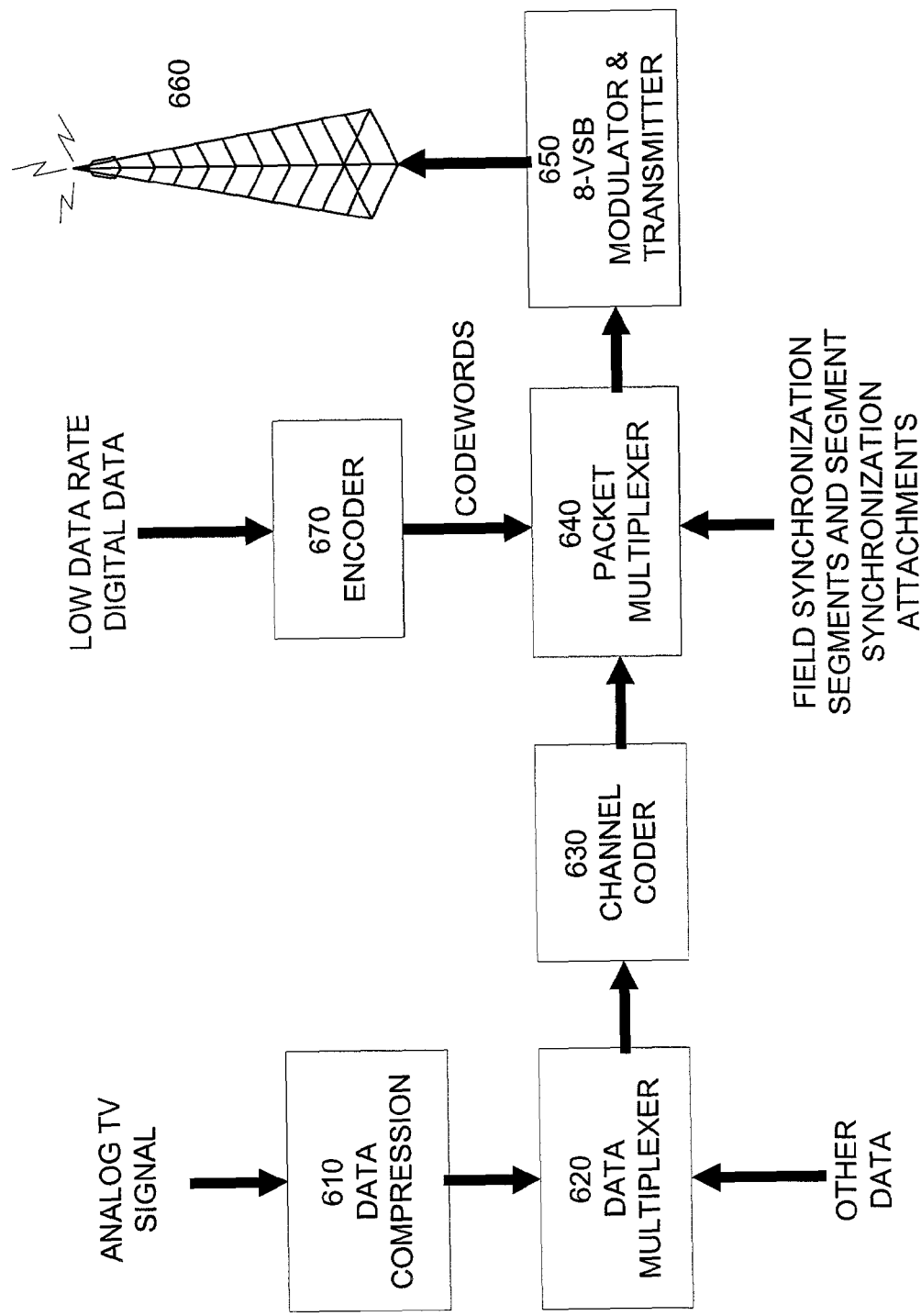
FIG. 6 is a block diagram of a DTV transmitter.

FIG. 6 is a block diagram of a DTV transmitter 106. This transmitter 106 includes the following elements, coupled in series: data compression engine 610, data multiplexer 620, channel coder 630, packet multiplexer 640 (for field synchronization segments, segment synchronization attachments, and codewords), 8-VSB modulator and transmitter 650 and transmission tower 660. The transmitter 106 also includes a data encoder 670 coupled to the packet multiplexer 640.

The transmitter 106 operates as follows. An analog television signal is compressed by compression engine 610. MPEG 2 is the data compression standard used by the current ATSC standard. This approach allows broadcasters to transmit a TV signal with data rates typically from 3 Mbps to 15 Mbps depending on the desired reception quality. In FIG. 6, other data entering the data multiplexer 620 could include a television signal already in digital form in which case the analog television signal entering 610 may not exist.

Since the standard 6 MHz bandwidth of a single analog TV channel can transmit 19.2 Mbps using the ATSC digital format, converting to digital provides broadcasters with extra capacity for sending other data and even multiple TV channels per 6 MHz channel. The data multiplexer 620 combines multiple streams of data into a single ATSC signal. Examples of other types of data include additional TV programming which is already in digital form and program guide information. Since data is packetized over the DTV broadcast signal, any type of digital data can be transmitted over the TV programming channel at the 19.2 Mbps data rate. There have been proposals to sent video rich forms of Internet web traffic over such TV programming channels.

Channel coder 630 encodes the resulting data packets in order to correct for channel errors. In a common approach, channel coder 630 implements a combination of Reed-Solomon error correction encoding, interleaving, and trellis encoding.

The ATSC standard for terrestrial broadcast uses 8-VSB modulation with 3-bit symbols in the form of 8 levels of amplitude. After channel coding, the coded data of 8-level symbols is divided into data segments.

The packet multiplexer 640 is the device that can replace data on a segment by segment basis. These devices are commercially available, for example the Source Media Router unit from the manufacturer SkyStream Networks. In many cases, these devices are currently used only to insert the two field synchronization segments per ATSC frame and the segment synchronization attachments at the end of each data segment, because there is no need for the replacement of other segments. However, standard add-ons support the replacement of data segments with other data segments, for example codewords in this case.

The sequence of 8-level symbols is sent to the 8-VSB modulator and transmitter 650. The modulator 650 applies the 8-VSB modulation. The transmitter 650 then broadcasts the resulting DTV signal via transmitter tower 660.

For the low data rate channel, the data encoder 670 generates the codewords from the incoming digital data. For example, the data encoder 670 can convert bit sequences to codewords using a lookup table. For applications which are not real-time, both the incoming bit sequences and/or outgoing codewords may be stored and subsequently retrieved from memory.

As an example, in the case of 3-bit sequences being translated to 828-symbol codewords, the data encoder 670 divides the incoming digital data into 3-bit sequences and then translates these into the corresponding codewords. In one implementation, this is accomplished by a lookup table that has a 3-bit input and outputs the corresponding codeword. The codewords from data encoder 670 are inserted into the ATSC frames at the transport layer by the packet multiplexer 640. Inserting codewords is very similar to inserting field synchronization segments, except that the actual data to be inserted is different. Since the packet multiplexer 640 almost certainly is already inserting field synchronization segments, it is straightforward to modify the existing packet multiplexer 640 to also insert codewords.

In one physical implementation, blocks 610–640 are implemented as equipment located at the television broadcast station. The modulator and transmitter 650 are located in close proximity to the tower 660, for example at the base of the tower. Other implementations will be apparent. For example, some or all of blocks 610–640 may be located at other physical locations, particularly if the television program is not a live broadcast. In this case, the prerecorded program may be processed at different locations.

Figure 7:
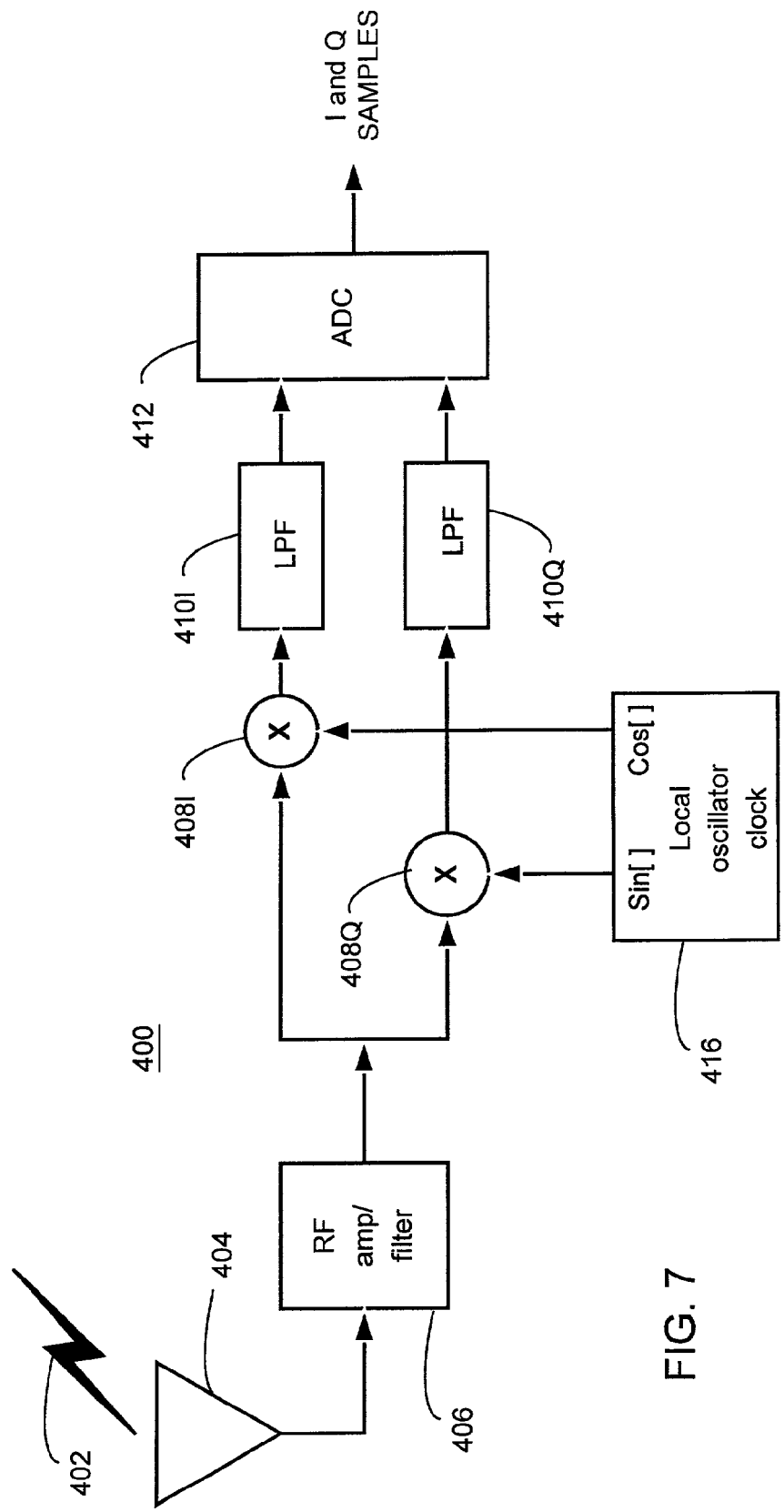
FIG. 7 is a block diagram of a front end for use in a receiver.

FIGS. 7–12 illustrate various aspects of receiver 102. The receiver 102 recovers the digital data from the codewords embedded in the broadcast DTV signal. FIG. 7 is a block diagram of a front end 400 for use in the receiver 102. The sampler 400 takes samples of the received DTV signal. In the approach shown in FIG. 7, the DTV broadcast signal 402 is received by an antenna 404, which is followed by filters and amplifiers 406. The filtered and amplified DTV broadcast signal is then converted into in-phase and quadrature baseband signals by a local oscillator 416, mixers 408I and 408Q, and low pass filters 410I and 410Q. In more detail, the DTV broadcast signal is split into two signals. Each mixer 408I,408Q multiplies one of the DTV broadcast signals with the sin or cosine component of the local oscillator 416, respectively. Each multiplied signal is then low pass filtered by filter 410I or 410Q, respectively, resulting in the baseband I and Q components of the received DTV broadcast signal. This is sampled and quantized by the analog to digital converter (ADC) 412. The digital samples of the basedband I and Q output of the ADC can be stored in memory for later processing, processed immediately by a digital processor, or enter digital circuits that perform digital processing in hardware. FIG. 7 is a typical front end for a receiver. In particular FIG. 7 can also be the front end of a conventional DTV receiver that receives TV programming data. Other types of fronts ends will be apparent.

Figure 8:
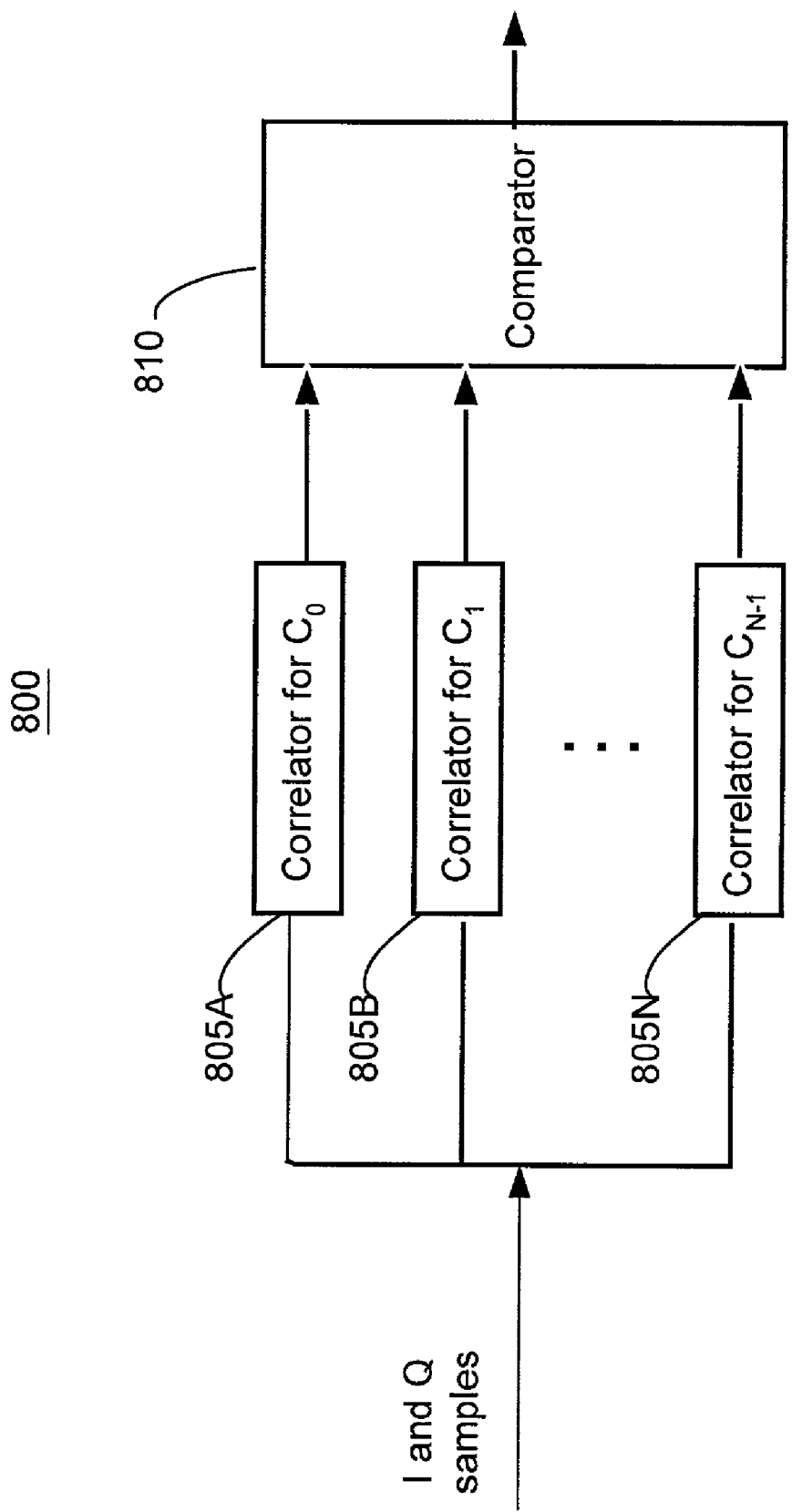
FIG. 8 is a block diagram of a back end based on a bank of correlators.

FIG. 8 is a block diagram of a back end for use in receiver 102. The back end 800 receives the digital I and Q samples from the front end of the receiver. For convenience, the I and Q samples are shown by a single line in FIG. 8 rather than separate lines for I and Q. The back end 800 includes a bank of correlators 805A–805N, with one correlator 805 for each of the possible codewords. FIG. 8 illustrates the general case where there are N possible codewords and N corresponding correlators 805. Each correlator 805 correlates the incoming samples against a template for the corresponding codeword. In one implementation, the template is a matched filter for the codeword. Thus, the output of correlator 805A provides a measure of the likelihood that the data segment being tested contains codeword $C_0$. Similarly, the correlation produced by correlator 805B measures the likelihood of codeword $C_1$ and so on. The bank of correlators 805 is coupled to a comparator 810, which determines which of the correlations is the largest. The data bits of the selected codeword are then output. For example, if correlator 805B produces the strongest correlation, then the bit sequence corresponding to codeword $C_1$ is recovered by the receiver.

Multipath is common in radio channels. At the receiver, multipath signals are multiple copies of the transmitted signal each with a different delay. This results in the correlator output having multiple correlation peaks of various sizes corresponding to the transmitted codeword. A receiver can take advantage of multipath and combine all of the multipath related correlation peaks out of each codeword correlator and then do the comparison among all such codeword correlators. This receiver would perform better than a conventional receiver that would only look at the correlator output at a particular instant in time. This type of receiver can be implemented by changing the basis for comparision in compator 810.

Figure 9:
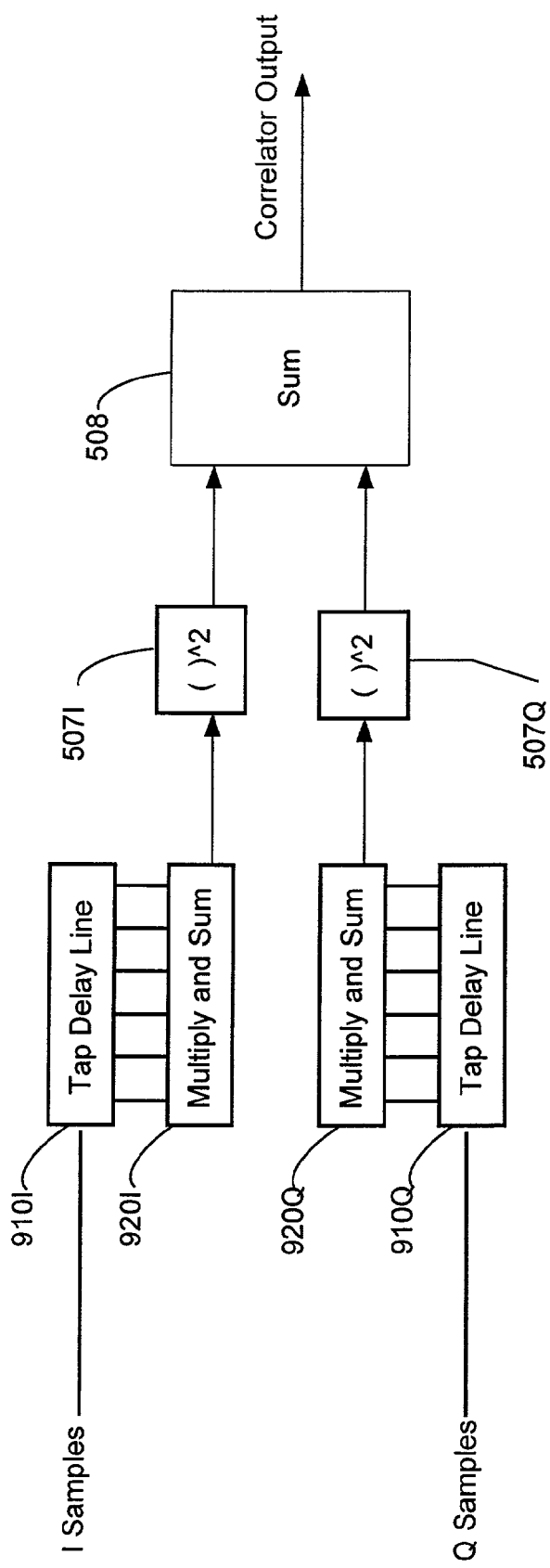
FIG. 9 is a block diagram of one correlator.

The correlators 805 shown in FIG. 8 can be implemented in many different ways. FIG. 9 is one example of a correlator 900. The I samples from the front end enter the tap delay line 910I and the Q samples from the front end enter the tap delay line 910Q. The codeword determines which of the samples in the tap delay lines 910I and 910Q are multiplied and summed in the devices 920I and 920Q. The tap delay lines 910 are long enough to store the samples for an entire codeword (e.g., an entire data segment if there is a one to one replacement of data segments by codewords). At each sample time, a new I and Q sample from the ADC 412 enters the tap delay lines 910I and 910Q. The parallel outputs from the tap delay lines 910I and 910Q flow to the multiply and sum devices 920I and 920Q, respectively. The outputs of these devices are squared in the square law devices 507I and 507Q and summed again in summer 508. Thus, correlator 900 generates an output for every sample time. In one embodiment of back end 800 of FIG. 8, the correlator 900 of FIG. 9 is repeated N times, once for each of the correlators 805 in FIG. 8. The multiply and sum circuit (920I and 920Q) is varied for each correlator 805, thus implementing correlations against different templates.

Figure 10:
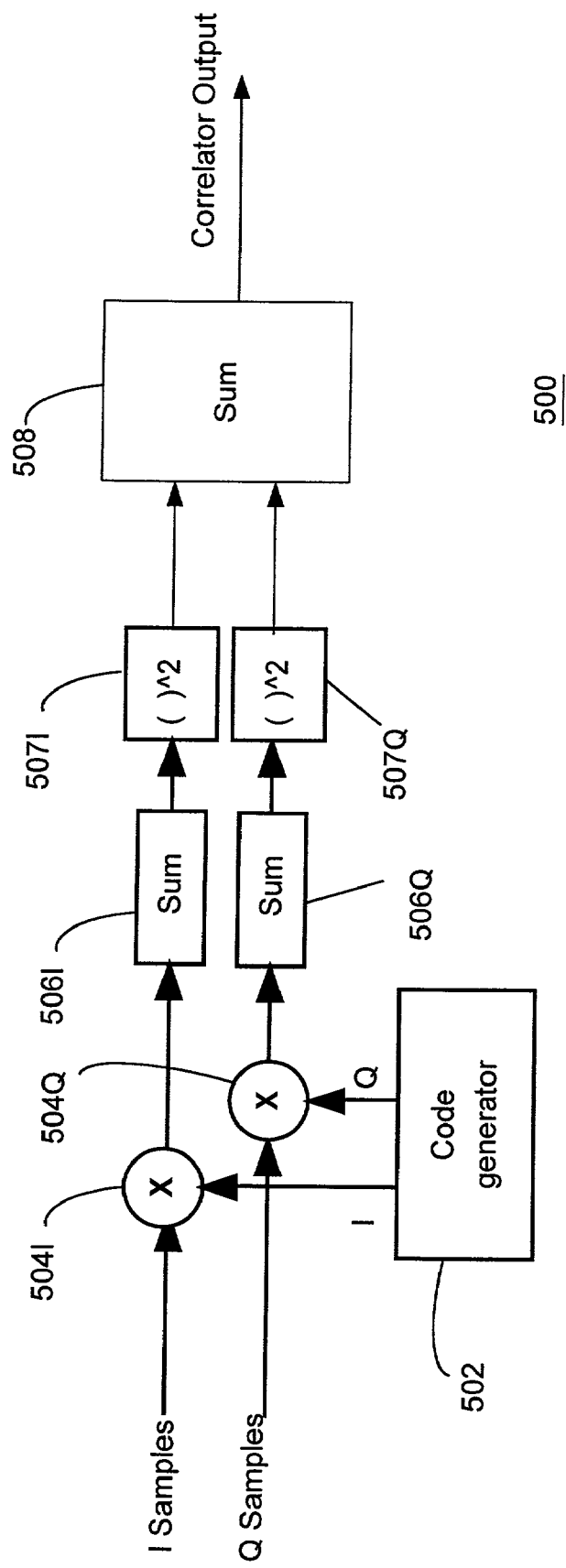
FIG. 10 is a block diagram of another correlator.

FIG. 10 illustrates another type of correlator 500 that can be used in FIG. 8. This is a serial correlator. The I and Q samples from the front end are multiplied by mixers 504I and 504Q, respectively, against the I and Q components of the code generator 502 which are uniquely determined by the codeword. The code generator 502 is synchronized with the arrival time of the samples being received by the back end. The multiplied I and Q samples are summed by summers 506I and 506Q. The sum is taken over the time interval of a codeword (e.g., over one data segment if there is a one to one replacement of data segments by codewords). These sums are squared in square law devices 507I and 507Q and then added together in the summer 508. Correlator 500 produces one output for the entire correlation. That is, correlator 500 generates the correlation function at a specific instant in time (typically, the instant when a correlation peak is expected). In contrast, correlator 900 of FIG. 9 generates samples of the correlation function at different times. In one embodiment of back end 800 of FIG. 8, the correlator 500 of FIG. 10 is repeated N times, once for each of the correlators 805 in FIG. 8. The templates for the different codewords are generated by varying the code generator 502.

In yet another embodiment, the back end of receiver 102 is implemented by a digital signal processor programmed to perform the required correlations.

Figure 11:
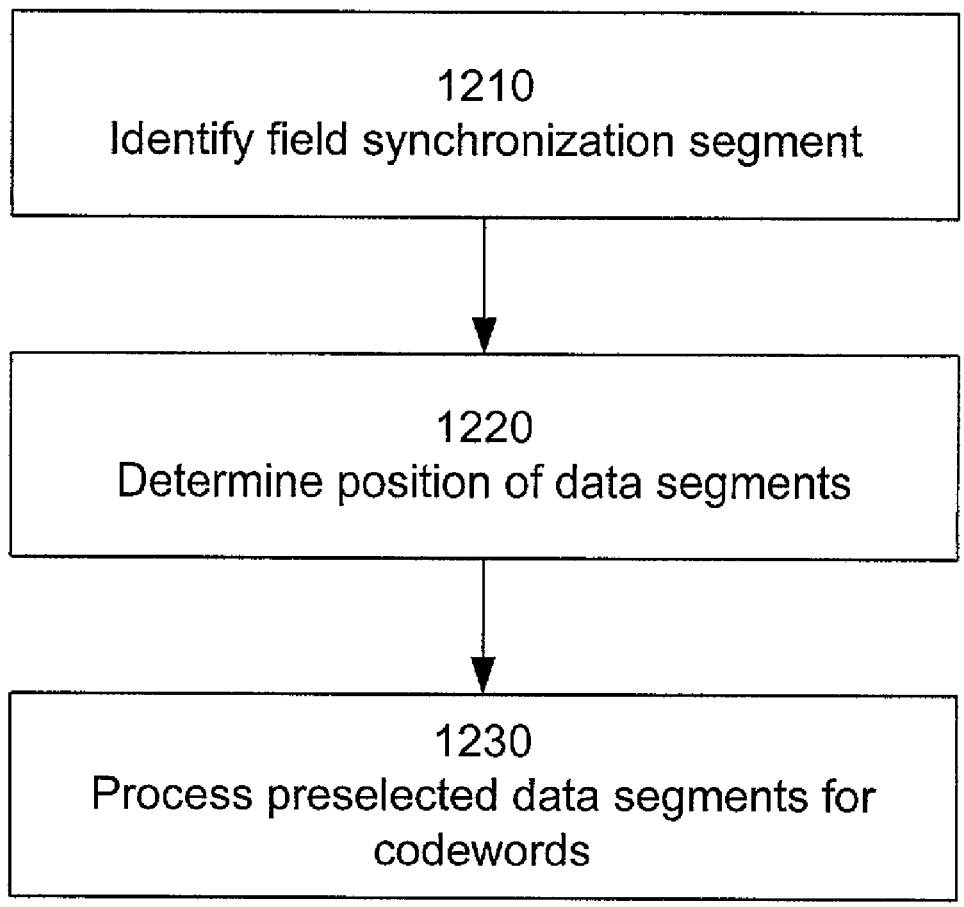
FIG. 11 is a flow diagram illustrating one method of recovering digital data based on establishing framing.

FIG. 11 is a flow diagram illustrating one method of recovering digital data by establishing framing of the incoming ATSC signal. The receiver 102 establishes framing by identifying 1210 the field synchronization segment within the ATSC frames. This can be accomplished, for example, by using a correlator 900 of FIG. 9 where the multiply and sum devices 920I and 920Q are designed to implement correlation against the field synchronization segments. Establishing framing simplifies the subsequent data recovery because individual data segments can then be identified and the temporal location of codewords will be known by the receiver 102. If framing was not established, the receivers would have to detect codewords without knowing the location of the beginning and end of each codeword at the receiver 102. This is more complex, although it could still be achieved, for example by using correlation or matched filtering but taking into account the unknown timing as to when codewords are being received by the receiver.

In more detail, recall that a field synchronization segment occurs once every 313 segments (or once every 24.4 ms) in the ATSC format of FIG. 2. Initially, a continuous stream of symbols is received by receiver 102. It is not know where data segments start and end, nor is it know which of the data segments is the field synchronization segment. To establish framing, both of these ambiguities are removed.

Figure 12:
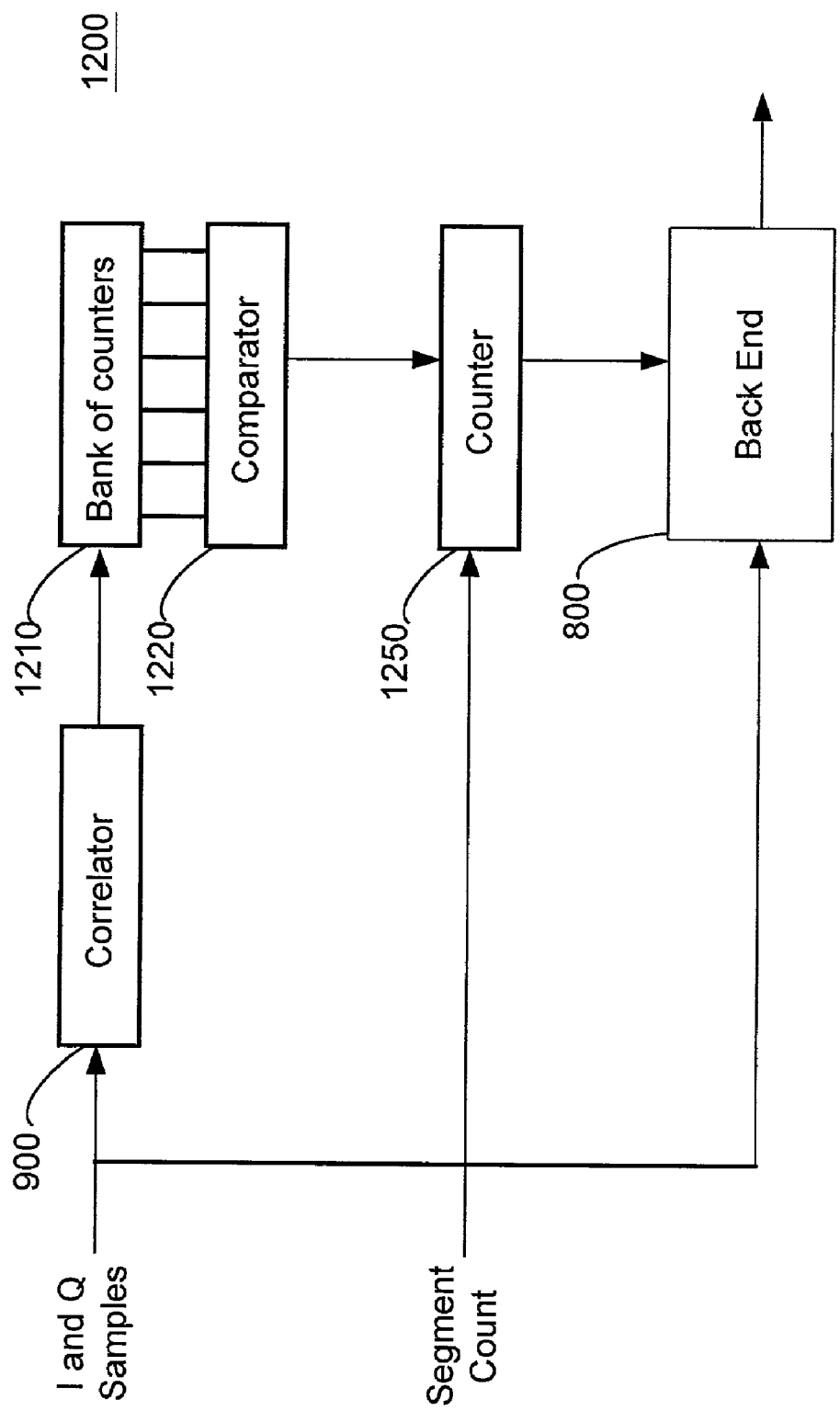
FIG. 12 is a block diagram of a back end for establishing framing.

FIG. 12 is a block diagram of a device 1200 which removes this ambiguity. This device 1200 includes back end 800, which will recover the digital data once framing is established. The rest of the device 1200 includes the following coupled in series: a correlator 900, a bank of counters 1210 and a comparator 1220. These elements are used to identify the field synchronization segment. The counter 1250 is used to synchronize back end 800. The block diagram is functional. Various implementations of the same functionality will be apparent.

The framing function of device 1200 operates as follows. The incoming stream of symbols is arbitrarily divided into 24.2 ms blocks, which are further divided into 313 intervals of 77.3 us each. The 24.2 ms blocks correspond to ATSC half-frames and the 77.3 us intervals correspond to data segments. In other words, a field synchronization segment will occur once during each 24.2 ms block and the field synchronization segment will last for one time interval of 77.3 us (although it might span the boundary of two adjacent 77.3 us intervals since the start and end of data segments is not yet known).

The correlator 900 correlates one incoming 77.3 us time interval against a "generic" field synchronization segment. The template is "generic" in the sense that the correlator 900 detects the 757 symbols which are common to all field synchronization segments (recall that some symbols vary between different field synchronization segments). The correlator 900 has an output for each sample time. That is, it outputs a correlation function sampled at many different points in time. This is useful since the exact location of the correlation peak is not yet known.

In the bank of counters 1210, one counter is assigned to each of the 313 time intervals. During each of the time intervals, the correlator output samples are compared to a threshold. If the output of correlator 900 exceeds the threshold, the counter 1210 for that time interval is incremented. This is repeated, cycling through the counters 1210 repeatedly, as each of the 313 intervals appear once every 24.4 milleseconds Thus, each counter 1210 counts the number of times each 313th time interval (e.g., the 1st, 314th, 627th, etc. time intervals for counter 1; the 2nd, 315th, 628th, etc. time intervals for counter 2, etc.) exceeds the threshold.

Over time, the counter 1210 with the largest count will be the one corresponding to the field synchronization segment. Comparator 1220 determines which count is the largest, thus identifying the field synchronization segment. Although the beginning of the field synchronization segment cannot be determined exactly by the bank of counters 1210 alone, the comparator will pin down the location of the field synchronization segment to within 77.3 microseconds. Exact location of the start of the field synchronization segment can be determined based on the fine structure of the output from correlator 900.

Assume that the noise in the front end of the receiver 102 is white Gaussian noise with double-sided spectral density of No. In a noise only interval not containing the field synchronization segment, an output sample is the sum of squares of two independent Gaussian random variables each with variance No/2. The probability that this sample X exceeds a threshold T is $$P(T)=Pr\{X>T\}=\exp\{-T/No\}. \quad (12)$$

The expected value of X is $E\{X\}=No$. If the threshold is set at three times this average, T=3No, then $$P(3No)=0.05 \quad (13)$$

is the probability that this noise sample exceeds the threshold and thus results in the counter being incremented.

Over a one second interval of time, there would be over 40 determinations for each of the 313 counters. If the signal-to-ratio at the receiver is above −22 dB then the counters should quickly show which of the 313 intervals contain the FSS. This is because the processing gain is about 29 dB, giving FSS correlation outputs of 6 to 7 dB stronger than the correlator outputs' noise background.

There are many ways in which the correlator output can be used to determine the lcoation of the field synchronization segment. In one example, the bank of counters 1210 is replaced by a bank of accumulators. The peak correlation for each of the 313 intervals is accumulated to produce 313 partial sums. That is, accumulator 1 accumulates the peak correlations for the 1st, 314th, 627th, etc. intervals. Over many frames, the largest partial sum will be the one corresponding to the field synchronization segment.

Once the field synchronization segment is identified, time-gated delay lock loops can be used to maintain lock onto multipath components of the received broadcast signal's field synchronization segment. Non-coherent combining of these delay lock loop outputs can be done to improve the processing gain.

Once framing is established, individual data segments can be identified and tested for codewords. In the example of FIG. 11, it is assumed that certain data segments are preselected for the low data rate channel. Then, the numerical position of the data segments is determined 1220 and the preselected data segments are processed for codewords. For example, if data segments 10–50 are preselected for the low data rate channel, then the receiver 102 need only count to segment 10 relative to the field synchronization segment and then process segments 10–50 for codewords.

Referring again to FIG. 12, assume that time interval #137 was identified as the field synchronization segment. The counter 1250 counts to data segments 10–50 with respect to the field synchronization segment and these data segments would be processed by back end 800.

If the transmitter were to insert codewords into segments when the opportunity arises, then the receiver does not know whether a data segment contains a codeword. As a result, after the receiver establishes framing, each data segment is processed by a bank of correlators, for example as shown in FIG. 8. Comparator 810 selects the most probable codeword based on correlation strength, but there is an additional decision as to whether a codeword was sent at all. In one approach, this decision is based on all of the correlator outputs. One example is to decide a codeword did not exist if there is no dominant peak correlator output among all of the correlator outputs. This is based on the fact that if a codeword was transmitted during this interval then the correlator output for the transmitted codeword would, with high probability, have a much larger correlator output peak than in the other codeword correlator outputs. As an example, the largest correlator output peak might be required to be at least twice the corresponding correlator output peaks of the other correlator output peak values for a decision to be made that a codeword was transmitted in the particular segment interval.

In an alternate embodiment, the functionality shown in FIG. 12 is implemented in a DSP processor.

Although the invention has been described in considerable detail with reference to certain preferred embodiments thereof, other embodiments are possible. For example, some of the examples were illustrated using a specific frequency, such as IF or baseband. This is not meant to limit these examples to these specific frequencies. In general, different implementations can operate at different frequencies. Similarly, various steps may be implemented either as analog or digital processes. As another example, processing of the incoming DTV signal can occur either in real-time, with no storage of the incoming signal, or by retrieving samples of the DTV signal from memory. As a final example, different types of templates may be used to achieve the correlation desired.

In the ATSC standard, the field synchronization segments use binary amplitude symbols while in general up to eight levels of amplitude are allowed in the transmitter's 8-VSB modulation signal. Commonly, the codewords will be selected to use 2 levels, 4 levels, or 8 levels of amplitude in the codeword symbol sequence. When more level symbols are used for codewords, there are more choices of codewords with good autocorrelation and cross correlation properties, thus improving the detection of codewords at the receiver 102. More levels, however, make the correlators in receiver 102 more complex.

In alternate embodiments, DTV signals other than ATSC signals can be used. All DTV signals rely on data segments which are organized into frames. Codewords can replace any of these data segments, resulting in a robust, low data rate transmission, so long as the replacement does not degrade the rest of the DTV signal in an unacceptable way. For example, if the data segments in a DTV format are independently encoded so that replacing one data segment does not affect the decoding of the other data segments, then data segments can be individually replaced on an as-available basis. The data segments preferably are replaced at the transport layer, although this is not required.

In alternate embodiments, the invention is implemented in computer hardware, firmware, software, and/or combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

What is claimed is:

1. A method for inserting digital data into a digital television (DTV) broadcast signal, the DTV signal comprising a plurality of frames, each frame comprising a plurality of data segments, the method comprising:
   encoding the digital data as codewords; and
   replacing data segments within the DTV signal with the codewords;
   wherein the step of encoding the digital data as codewords comprises
      dividing the digital data into bit sequences; and
      encoding each bit sequence as a corresponding codeword selected from a finite set of codewords wherein:
         each codeword corresponds to a specific bit sequence,
         the codewords are all of the same length, and
         each codeword is longer than its corresponding bit sequence.

2. The method of claim 1 wherein the DTV signal comprises a signal selected from the group consisting of:
   an American Television Standards Committee (ATSC) DTV signal;
   a Digital Video Broadcast (DVB) DTV signal; and
   a Direct Broadcast Satellite (DBS) DTV signal.

3. The method of claim 1 wherein the codewords in the finite set are orthogonal to each other.

4. The method of claim 1 wherein the bit sequences are all of the same length.

5. The method of claim 1 wherein the codewords in the finite set are a same length as the data segments.

6. The method of claim 1 wherein the step of replacing data segments with codewords comprises:
   replacing each data segment with at least two codewords.

7. The method of claim 1 wherein:
   each bit sequence is N bits long, and
   there are $2^N$ codewords corresponding to the bit sequences.

8. The method of claim 1 wherein the step of encoding each bit sequence as a corresponding codeword comprises:

selecting the codeword from a lookup table which matches bit sequences with their corresponding codewords.

9. The method of claim 1 wherein each codeword represents not more than three bits of digital data.

10. The method of claim 1 wherein each codeword comprises multi-amplitude symbols.

11. The method of claim 1 wherein the step of replacing data segments with codewords comprises:
selecting data segments according to their numerical position within a frame; and
replacing only the selected data segments with codewords.

12. The method of claim 1 wherein the step of replacing data segments with codewords comprises:
determining whether a data segment is unused; and
replacing only unused data segments with codewords.

13. The method of claim 1 further comprising:
broadcasting the DTV signal.

14. The method of claim 13 further comprising:
receiving the broadcast DTV signal; and
recovering the digital data from the received DTV signal.

15. A method for recovering digital data from a broadcast digital television (DTV) signal, comprising:
receiving a broadcast DTV signal comprising a plurality of frames, each frame comprising a plurality of data segments, wherein at least one data segment has been replaced by at least one codeword representing digital data;
selecting the data segments which have been replaced by codewords; and
recovering the digital data from the selected data segments; and
wherein each codeword is selected from a finite set of codewords wherein
each codeword corresponds to a specific bit sequence,
the codewords are all of the same length, and
each codeword is longer than its corresponding bit sequence, and
the step of recovering the digital data from the selected data segments comprises recovering the bit sequences from the selected data segments.

16. The method of claim 15 wherein the DTV signal comprises a signal selected from the group consisting of:
an American Television Standards Committee (ATSC) DTV signal;
a Digital Video Broadcast (DVB) DTV signal; and
a Direct Broadcast Satellite (DBS) DTV signal.

17. The method of claim 15 wherein the codewords in the finite set are a same length as the data segments.

18. The method of claim 15 wherein the step of recovering the bit sequences from the selected data segments comprises:
identifying which of the data segments in the received DTV signal have been replaced by codewords; and
for data segments identified as having been replaced by codewords:
correlating the data segment against a template for each codeword in the finite set of codewords; and
selecting the codeword corresponding to the template which produces the strongest correlation peak.

19. The method of claim 18 wherein the template for a codeword is a matched filter for the codeword.

20. The method of claim 18 wherein:
only preselected data segments have been replaced by codewords, and the data segments are preselected according to their numerical position within a frame; and
the step of identifying which of the data segments in the received DTV signal have been replaced by codewords comprises determining which of the data segments occupy the preselected numerical positions within the frame.

21. The method of claim 18 wherein:
the DTV signal includes a field synchronization segment which repeats once every N segments;
only preselected data segments have been replaced by codewords, and the data segments are preselected according to their numerical position with respect to the field synchronization segment; and
the step of identifying which of the data segments in the received DTV signal have been replaced by codewords comprises:
correlating the data segments against a template for the field synchronization segment;
accumulating the correlations to produce N partial sums, each partial sum reflecting a sum of peaks of every Nth correlation;
determining which of the N partial sums is the largest to identify the field synchronization segment; and
determining which of the data segments occupy the preselected numerical positions with respect to the field synchronization segment.

22. The method of claim 18 wherein:
the DTV signal includes a field synchronization segment which repeats once every N segments;
only preselected data segments have been replaced by codewords, and the data segments are preselected according to their numerical position with respect to the field synchronization segment; and
the step of identifying which of the data segments in the received DTV signal have been replaced by codewords comprises:
correlating the data segments against a template for the field synchronization segment;
generating N counts from the correlations, each count reflecting a number of times every Nth correlation exceeds a threshold;
determining which of the N counts is the largest to identify the field synchronization segment; and
determining which of the data segments occupy the preselected numerical positions with respect to the field synchronization segment.

23. A DTV transmitter device for inserting digital data into a digital television (DTV) broadcast signal, the DTV signal comprising a plurality of frames, each frame comprising a plurality of data segments, the DTV transmitter device comprising:
means for encoding the digital data as codewords; and
means for replacing data segments within the DTV signal with the codewords; and
wherein the means for encoding the digital data as codewords comprises
means for dividing the digital data into bit sequences, and means for encoding each bit sequence as a corresponding codeword selected from a finite set of codewords wherein
each codeword corresponds to a specific bit sequence,
the codewords are all of the same length, and
each codeword is longer than its corresponding bit sequence.

24. The DTV transmitter device of claim 23 wherein the DTV signal comprises a signal selected from the group consisting of:
an American Television Standards Committee (ATSC) DTV signal;
a Digital Video Broadcast (DVB) DTV signal; and
a Direct Broadcast Satellite (DBS) DTV signal.

25. The DTV transmitter device of claim 23 wherein the codewords in the finite set are orthogonal to each other.

26. The DTV transmitter device of claim 23 wherein the codewords in the finite set are a same length as the data segments.

27. The DTV transmitter device of claim 23 wherein:
each bit sequence is N bits long, and
there are 2^N codewords corresponding to the bit sequences.

28. The DTV transmitter device of claim 23 wherein the means for replacing data segments with codewords is further for:
selecting data segments according to their numerical position within a frame; and
replacing only the selected data segments with codewords.

29. The DTV transmitter device of claim 23 wherein the means for replacing data segments with codewords is further for:
determining whether a data segment is unused; and
replacing only unused data segments with codewords.

30. A DTV receiver device for recovering digital data from a broadcast digital television (DTV) signal, comprising:
means for receiving a broadcast DTV signal comprising a plurality of frames, each frame comprising a plurality of data segments, wherein at least one data segment has been replaced by at least one codeword representing digital data;
means for selecting the data segments which have been replaced by codewords; and
means for recovering the digital data from the selected data segments; and
wherein each codeword is selected from a finite set of codewords wherein
each codeword corresponds to a specific bit sequence,
the codewords are all of the same length,
each codeword is longer than its corresponding bit sequence, and
the means for recovering the digital data from the selected data segments comprises means for recovering the bit sequences from the selected data segments.

31. The DTV receiver device of claim 30 wherein the DTV signal comprises a signal selected from the group consisting of:
an American Television Standards Committee (ATSC) DTV signal;
a Digital Video Broadcast (DVB) DTV signal; and
a Direct Broadcast Satellite (DBS) DTV signal.

32. The DTV receiver device of claim 30 wherein the codewords in the finite set are orthogonal to each other.

33. The DTV receiver device of claim 30 wherein the bit sequences are all of the same length.

34. The DTV receiver device of claim 30 wherein the codewords in the finite set are a same length as the data segments.

35. The DTV receiver device of claim 30 wherein the means for recovering the bit sequences from the received DTV signal comprises:
means for identifying which of the data segments in the received DTV signal have been replaced by codewords; and
for data segments identified as having been replaced by codewords:
means for correlating the data segment against a template for each codeword in the finite set of codewords; and
means for selecting the codeword corresponding to the template which produces the strongest correlation peak.

36. The DTV receiver device of claim 35 wherein the template for a codeword is a matched filter for the codeword.

37. The DTV receiver device of claim 35 wherein:
only preselected data segments have been replaced by codewords, and the data segments are preselected according to their numerical position within a frame; and
the means for identifying which of the data segments in the received DTV signal have been replaced by codewords comprises means for determining which of the data segments occupy the preselected numerical positions within the frame.

38. The DTV receiver device of claim 35 wherein:
the DTV signal includes a field synchronization segment which repeats once every N segments;
only preselected data segments have been replaced by codewords, and the data segments are preselected according to their numerical position with respect to the field synchronization segment; and
the means for identifying which of the data segments in the received DTV signal have been replaced by codewords comprises:
means for correlating the data segments against a template for the field synchronization segment,
means for accumulating the correlations to produce N partial sums, each partial sum reflecting a sum of peaks of every Nth correlation,
means for determining which of the N partial sums is the largest to identify the field synchronization segment, and
means for determining which of the data segments occupy the preselected numerical positions with respect to the field synchronization segment.

39. The DTV receiver device of claim 35 wherein:
the DTV signal includes a field synchronization segment which repeats once every N segments;
only preselected data segments have been replaced by codewords, and the data segments are preselected according to their numerical position with respect to the field synchronization segment; and
the means for identifying which of the data segments in the received DTV signal have been replaced by codewords comprises:
means for correlating the data segments against a template for the field synchronization segment,
means for generating N counts from the correlations, each count reflecting a number of times every Nth correlation exceeds a threshold, means for determining which of the N counts is the largest to identify the field synchronization segment, and means for determining which of the data segments occupy the preselected numerical positions with respect to the field synchronization segment.

40. A DTV receiver device for recovering digital data from a broadcast digital television (DTV) signal, comprising:
a front end adapted to receive a broadcast DTV signal comprising a plurality of frames, each frame comprising a plurality of data segments, wherein data segments have been replaced by codewords representing digital data and the codewords are selected from a finite set of codewords; and
a bank of correlators coupled to the front end and adapted to correlate the data segments against templates for codewords from the finite set of codewords; and
wherein each codeword is selected from a finite set of codewords wherein
each codeword corresponds to a specific bit sequence,
the codewords are all of the same length, and
each codeword is longer than its corresponding bit sequence.

41. The DTV receiver device of claim 40 wherein the DTV signal comprises a signal selected from the group consisting of:
an American Television Standards Committee (ATSC) DTV signal;
a Digital Video Broadcast (DVB) DTV signal; and
a Direct Broadcast Satellite (DBS) DTV signal.

42. The DTV receiver device of claim 40 wherein the template for a codeword is a matched filter for the codeword.

43. A DTV receiver device for recovering digital data from a broadcast digital television (DTV) signal, comprising:
a front end adapted to receive a broadcast DTV signal comprising a plurality of frames, each frame comprising a plurality of data segments, wherein data segments have been replaced by codewords representing digital data and the codewords are selected from a finite set of codewords; and
a bank of correlators coupled to the front end and adapted to correlate the data segments against templates for codewords from the finite set of codewords; and
wherein the front end comprises
an antenna,
a mixer coupled to the antenna and adapted to downconvert the received DTV signal, and
a sampler coupled between the mixer and the bank of correlators and adapted to sample the downconverted DTV signal.

44. The DTV receiver device of claim 43 wherein the sampler includes:
an I channel and a Q channel adapted to produce I and Q samples of the downconverted DTV signal.

45. A DTV receiver device for recovering digital data from a broadcast digital television (DTV) signal, comprising:
a front end adapted to receive a broadcast DTV signal comprising a plurality of frames, each frame comprising a plurality of data segments, wherein data segments have been replaced by codewords representing digital data and the codewords are selected from a finite set of codewords; and
a bank of correlators coupled to the front end and adapted to correlate the data segments against templates for codewords from the finite set of codewords; and
wherein
the front end comprises a sampler adapted to sample the DTV signals, and
each correlator within the bank of correlators comprises
a tap delay line having a parallel output adapted to receive and store samples of a data segment, and
a multiply and sum device coupled to the parallel output of the tap delay line and adapted to correlate the data segment against a template for a codeword.

46. The DTV receiver device of claim 45 wherein the tap delay line is further adapted to store samples for an entire data segment.

47. A DTV transmitter device for inserting digital data into a digital television (DTV) broadcast signal, the DTV signal comprising a plurality of frames, each frame comprising a plurality of data segments, the DTV transmitter device comprising:
an encoder adapted to encode the digital data as codewords; and
a packet multiplexer adapted to replace data segments within the DTV signal with the codewords; and
wherein the encoder is further adapted to
divide the digital data into bit sequences, and
encode each bit sequence as a corresponding codeword selected from a finite set of codewords wherein
each codeword corresponds to a specific bit sequence,
the codewords are all of the same length, and
each codeword is longer than its corresponding bit sequence.

48. The DTV transmitter device of claim 47 wherein the DTV signal comprises a signal selected from the group consisting of:
an American Television Standards Committee (ATSC) DTV signal;
a Digital Video Broadcast (DVB) DTV signal; and
a Direct Broadcast Satellite (DBS) DTV signal.

49. The DTV transmitter device of claim 47 wherein the codewords in the finite set are orthogonal to each other.

50. The DTV transmitter device of claim 47 wherein the codewords in the finite set are a same length as the data segments.

51. The DTV transmitter device of claim 47 wherein:
each bit sequence is N bits long, and
there are $2^N$ codewords corresponding to the bit sequences.

52. The DTV transmitter device of claim 47 wherein the packet multiplexer is further adapted to:
select data segments according to their numerical position within a frame; and
replace only the selected data segments with codewords.

53. The DTV transmitter device of claim 47 wherein the packet multiplexer is further adapted to:
determine whether a data segment is unused; and
replace only unused data segments with codewords.

54. Computer-readable media embodying instructions executable by a computer to perform a method for inserting digital data into a digital television (DTV) broadcast signal, the DTV signal comprising a plurality of frames, each frame comprising a plurality of data segments, the method comprising:
encoding the digital data as codewords; and
replacing data segments within the DTV signal with the codewords;

wherein the step of encoding the digital data as codewords comprises
   dividing the digital data into bit sequences, and
   encoding each bit sequence as a corresponding codeword selected from a finite set of codewords wherein
      each codeword corresponds to a specific bit sequence,
      the codewords are all of the same length, and
      each codeword is longer than its corresponding bit sequence.

55. The media of claim 54 wherein the DTV signal comprises a signal selected from the group consisting of:
   an American Television Standards Committee (ATSC) DTV signal;
   a Digital Video Broadcast (DVB) DTV signal; and
   a Direct Broadcast Satellite (DBS) DTV signal.

56. The media of claim 54 wherein the codewords in the finite set are orthogonal to each other.

57. The media of claim 54 wherein the bit sequences are all of the same length.

58. The media of claim 54 wherein the codewords in the finite set are a same length as the data segments.

59. The media of claim 54 wherein the step of replacing data segments with codewords comprises:
   replacing each data segment with at least two codewords.

60. The media of claim 54 wherein:
   each bit sequence is N bits long, and
   there are 2^N codewords corresponding to the bit sequences.

61. The media of claim 54 wherein the step of encoding each bit sequence as a corresponding codeword comprises:
   selecting the codeword from a lookup table which matches bit sequences with their corresponding codewords.

62. The media of claim 54 wherein each codeword represents not more than three bits of digital data.

63. The media of claim 54 wherein each codeword comprises multi-amplitude symbols.

64. The media of claim 54 wherein the step of replacing data segments with codewords comprises:
   selecting data segments according to their numerical position within a frame; and
   replacing only the selected data segments with codewords.

65. The media of claim 54 wherein the step of replacing data segments with codewords comprises:
   determining whether a data segment is unused; and
   replacing only unused data segments with codewords.

66. The media of claim 54 wherein the method further comprises:
   broadcasting the DTV signal.

67. The media of claim 66 wherein the method further comprises:
   receiving the broadcast DTV signal; and
   recovering the digital data from the received DTV signal.

68. Computer-readable media embodying instructions executable by a computer to perform a method for recovering digital data from a broadcast digital television (DTV) signal, the method comprising:
   receiving a broadcast DTV signal comprising a plurality of frames, each frame comprising a plurality of data segments, wherein at least one data segment has been replaced by at least one codeword representing digital data;
   selecting the data segments which have been replaced by codewords; and
   recovering the digital data from the selected data segments; and
   wherein each codeword is selected from a finite set of codewords wherein
      each codeword corresponds to a specific bit sequence,
      the codewords are all of the same length,
      each codeword is longer than its corresponding bit sequence, and
      the step of recovering the digital data from the selected data segments comprises recovering the bit sequences from the selected data segments.

69. The media of claim 68 wherein the DTV signal comprises a signal selected from the group consisting of:
   an American Television Standards Committee (ATSC) DTV signal;
   a Digital Video Broadcast (DVB) DTV signal; and
   a Direct Broadcast Satellite (DBS) DTV signal.

70. The media of claim 68 wherein the codewords in the finite set are a same length as the data segments.

71. The media of claim 68 wherein the step of recovering the bit sequences from the selected data segments comprises:
   identifying which of the data segments in the received DTV signal have been replaced by codewords; and
   for data segments identified as having been replaced by codewords:
   correlating the data segment against a template for each codeword in the finite set of codewords; and
   selecting the codeword corresponding to the template which produces the strongest correlation peak.

72. The media of claim 71 wherein the template for a codeword is a matched filter for the codeword.

73. The media of claim 71 wherein:
   only preselected data segments have been replaced by codewords, and the data segments are preselected according to their numerical position within a frame; and
   the step of identifying which of the data segments in the received DTV signal have been replaced by codewords comprises determining which of the data segments occupy the preselected numerical positions within the frame.

74. The media of claim 71 wherein:
   the DTV signal includes a field synchronization segment which repeats once every N segments;
   only preselected data segments have been replaced by codewords, and the data segments are preselected according to their numerical position with respect to the field synchronization segment; and
   the step of identifying which of the data segments in the received DTV signal have been replaced by codewords comprises:
   correlating the data segments against a template for the field synchronization segment;
   accumulating the correlations to produce N partial sums, each partial sum reflecting a sum of peaks of every Nth correlation;
   determining which of the N partial sums is the largest to identify the field synchronization segment; and
   determining which of the data segments occupy the preselected numerical positions with respect to the field synchronization segment.

75. The media of claim 71 wherein:
   the DTV signal includes a field synchronization segment which repeats once every N segments;
   only preselected data segments have been replaced by codewords, and the data segments are preselected according to their numerical position with respect to the field synchronization segment; and the step of identifying which of the data segments in the received DTV signal have been replaced by codewords comprises:

correlating the data segments against a template for the field synchronization segment;

generating N counts from the correlations, each count reflecting a number of times every Nth correlation exceeds a threshold;

determining which of the N counts is the largest to identify the field synchronization segment; and determining which of the data segments occupy the preselected numerical positions with respect to the field synchronization segment.

76. A DTV receiver device for recovering digital data from a broadcast digital television (DTV) signal, comprising:

a front end adapted to receive a broadcast DTV signal comprising a plurality of frames, each frame comprising a plurality of data segments, wherein data segments have been replaced by codewords representing digital data and the codewords are selected from a finite set of codewords;

a bank of correlators coupled to the front end and adapted to correlate the data segments against templates for codewords from the finite set of codewords; and a comparator coupled to the bank of correlators and adapted to determine which of the correlations produced by the bank of correlators has the strongest peak.

77. A DTV receiver device for recovering digital data from a broadcast digital television (DTV) signal, comprising:

a front end adapted to receive a broadcast DTV signal comprising a plurality of frames, each frame comprising a plurality of data segments, wherein data segments have been replaced by codewords representing digital data and the codewords are selected from a finite set of codewords;

a bank of correlators coupled to the front end and adapted to correlate the data segments against templates for codewords from the finite set of codewords;

a field synchronization correlator coupled to the antenna and adapted to correlate the data segments against a template for a field synchronization segment, wherein the DTV signal includes a field synchronization segment which repeats once every N segments;

a bank of accumulators coupled to the field synchronization correlator and adapted to accumulate the correlations to produce N partial sums, each partial sum reflecting a sum of peaks of every Nth correlation;

a comparator coupled to the bank of accumulators and adapted to determine which of the N partial sums is the largest to identify the field synchronization segment; and a counter coupled to the antenna and the comparator and adapted to determine a numerical position of data segments with respect to the field synchronization segment, wherein only preselected data segments have been replaced by codewords, and the data segments are preselected according to their numerical position with respect to the field synchronization segment.

78. A DTV receiver device for recovering digital data from a broadcast digital television (DTV) signal, comprising:

a front end adapted to receive a broadcast DTV signal comprising a plurality of frames, each frame comprising a plurality of data segments, wherein data segments have been replaced by codewords representing digital data and the codewords are selected from a finite set of codewords;

a bank of correlators coupled to the front end and adapted to correlate the data segments against templates for codewords from the finite set of codewords;

a field synchronization correlator coupled to the antenna and adapted to correlate the data segments against a template for a field synchronization segment, wherein the DTV signal includes a field synchronization segment which repeats once every N segments;

a bank of counters coupled to the field synchronization correlator and adapted to generate N counts from the correlations, each count reflecting a number of times every Nth correlation exceeds a threshold;

a comparator coupled to the bank of counters and adapted to determine which of the N counts is the largest to identify the field synchronization segment; and a counter coupled to the antenna and the comparator and adapted to determine a numerical position of data segments with respect to the field synchronization segment, wherein only preselected data segments have been replaced by codewords, and the data segments are preselected according to their numerical position with respect to the field synchronization segment.

79. A DTV receiver device for recovering digital data from a broadcast digital television (DTV) signal, comprising:

a front end adapted to receive a broadcast DTV signal comprising a plurality of frames, each frame comprising a plurality of data segments, wherein data segments have been replaced by codewords representing digital data and the codewords are selected from a finite set of codewords; and a bank of correlators coupled to the front end and adapted to correlate the data segments against templates for codewords from the finite set of codewords; and wherein the front end comprises a sampler adapted to sample the DTV signals, and the bank of correlators comprises a DSP processor programmed to correlate the data segments against templates for the codewords.

* * * * *